United States Patent
Ho et al.

(10) Patent No.: US 9,991,504 B2
(45) Date of Patent: Jun. 5, 2018

(54) METHOD OF PREPARING CATHODE FOR SECONDARY BATTERY

(71) Applicant: GRST International Limited, Hong Kong (HK)

(72) Inventors: Kam Piu Ho, Hong Kong (HK);
Ranshi Wang, Hong Kong (HK);
Peihua Shen, Guangdong (CN)

(73) Assignee: GRST International Limited, Hong Kong (HK)

( * ) Notice: Subject to any disclaimer, the term of this patent is extended or adjusted under 35 U.S.C. 154(b) by 0 days. days.

(21) Appl. No.: 15/404,227

(22) Filed: Jan. 12, 2017

(65) Prior Publication Data

US 2017/0207442 A1 Jul. 20, 2017

Related U.S. Application Data

(60) Provisional application No. 62/279,841, filed on Jan. 18, 2016.

(30) Foreign Application Priority Data

Dec. 13, 2016 (WO) ................ PCT/CN2016/109723

(51) Int. Cl.
| | |
|---|---|
| *H01M 4/04* | (2006.01) |
| *H01M 4/62* | (2006.01) |
| *H01M 4/525* | (2010.01) |
| *H01M 4/505* | (2010.01) |
| *H01M 4/131* | (2010.01) |
| *H01M 4/1391* | (2010.01) |
| *H01M 4/485* | (2010.01) |
| *H01M 10/0525* | (2010.01) |

(52) U.S. Cl.
CPC ....... *H01M 4/0404* (2013.01); *H01M 4/0419* (2013.01); *H01M 4/131* (2013.01);
(Continued)

(58) Field of Classification Search
USPC ........................................................ 427/115
See application file for complete search history.

(56) References Cited

U.S. PATENT DOCUMENTS

| | | | | |
|---|---|---|---|---|
| 7,662,516 B2* | 2/2010 | Fukunaga | ............... | H01M 4/04 |
| | | | | 429/128 |
| 8,652,688 B2* | 2/2014 | Yushin | ................... | H01M 2/16 |
| | | | | 429/217 |

(Continued)

FOREIGN PATENT DOCUMENTS

| | | |
|---|---|---|
| CN | 103887556 A | 6/2014 |
| CN | 105261753 A | 1/2016 |

(Continued)

OTHER PUBLICATIONS

International Search Report with Written Opinion in respect of PCT Patent Application No. PCT/CN2018/071679 dated Mar. 28, 2018.

*Primary Examiner* — Brian K Talbot

(57) ABSTRACT

Provided herein is a method for preparing a cathode electrode based on an aqueous slurry. The invention provides a cathode slurry comprising a cathode material especially high Ni ternary cathode material with improved water stability. The cathode material shows lower tendencies for pH change when applied in the aqueous slurry. The lower processing temperatures may avoid the undesirable decomposition of cathode material having high nickel and/or manganese content. In addition, the batteries having the electrodes prepared by the method disclosed herein show impressive energy retention. The capacity retention of the battery is not less than 60% of its initial capacity after 2 weeks of high temperature storage.

18 Claims, 9 Drawing Sheets

(52) U.S. Cl.
CPC ......... *H01M 4/1391* (2013.01); *H01M 4/485* (2013.01); *H01M 4/505* (2013.01); *H01M 4/525* (2013.01); *H01M 4/622* (2013.01); *H01M 4/625* (2013.01); *H01M 4/0409* (2013.01); *H01M 10/0525* (2013.01)

(56) References Cited

U.S. PATENT DOCUMENTS

| | | | |
|---|---|---|---|
| 2012/0225199 A1* | 9/2012 | Muthu | H01M 4/131 427/126.4 |
| 2013/0236783 A1* | 9/2013 | Kose | H01M 4/13 429/211 |
| 2013/0252092 A1* | 9/2013 | Huang | H01M 4/762 429/211 |
| 2015/0010460 A1* | 1/2015 | Takeuchi | H01M 4/587 423/449.6 |
| 2016/0126553 A1* | 5/2016 | Murase | H01M 4/13 429/217 |
| 2017/0207441 A1* | 7/2017 | Shen | H01M 4/0471 |

FOREIGN PATENT DOCUMENTS

| | | | |
|---|---|---|---|
| CN | 105762353 A | | 7/2016 |
| CN | 105932226 A | | 9/2016 |
| CN | 106299280 A | | 1/2017 |
| JP | 2004355996 A | | 12/2004 |

\* cited by examiner

METHOD OF PREPARING CATHODE FOR SECONDARY BATTERY

CROSS REFERENCE TO RELATED APPLICATIONS

The present application claims the benefit of U.S. Provisional Patent Application No. 62/279,841 filed Jan. 18, 2016 and PCT application No. PCT/CN2016/109723 filed on Dec. 13, 2016. All the above are hereby incorporated by reference.

FIELD OF THE INVENTION

The present invention relates to the field of batteries. In particular, this invention relates to methods for preparing cathode for lithium-ion batteries.

BACKGROUND OF THE INVENTION

In the past decades, lithium-ion batteries (LIBs) have been widely utilized in various applications especially consumer electronics because of their superior energy density, long cycle life and discharging capability. Due to rapid market development of electric vehicles (EV) and grid energy storage, high-performance, low-cost LIBs are currently offering one of the most promising options for large-scale energy storage devices.

The use of multi-element lithium transition metal oxide such as lithium nickel manganese cobalt oxide (NMC) and lithium nickel cobalt aluminum oxide (NCA) has become popular due their superior electrochemical properties over traditional cathode material such as $LiMnO_2$, $LiCoO_2$, and $LiNiO_2$. High nickel cathode material exhibits a high energy density and superior capacity property.

Currently, a cathode slurry may be prepared by dispersing a cathode active material, binder material and conductive agent in an organic solvent such as N-methyl-2-pyrrolidone (NMP). The cathode slurry is then coated onto a current collector and dried to prepare a cathode.

The use of aqueous solutions instead of organic solvents is preferred for environmental and handling reasons and therefore water-based slurries have been considered. However, high nickel cathode material is sensitive to water exposure. Upon exposure to water, lithium at the surface of the cathode material reacts with water thereby resulting in the formation of soluble bases. The high content of soluble base will affect the pH of the cathode slurry. However, pH values outside certain ranges (e.g., above pH 10) may affect dispersion homogeneity of components (e.g., cathode active material) in the cathode slurry and binding strength of the binder material, and can also have negative effects on the metallic components of the electrode (e.g., the metallic collector). These factors all contribute to poor electrochemical performance. Conventionally, a pH modifier is used to adjust the pH of the cathode slurry. However, additives may also have a deleterious effect on the electrochemical processes that take place at the cathode, especially at higher voltages and high temperature, which in turn reduces battery performance. Accordingly, it is desirable to adjust a pH of the cathode slurry without adding any additives.

CN Patent Application No. 105762353 A discloses a method of preparing a lithium-ion battery having high nickel ternary cathode material. The method comprises mixing a high nickel ternary cathode material with a conductive agent in a blender to obtain a mixture; adding a binder and water to the mixture with mixing; adding more water to the mixture until reaching a certain viscosity. However, the cycle life of the batteries prepared by this method is less than 360 cycles in terms of 20% loss of its initial capacity, which is insufficient for many intended applications such as portable electronics and electric vehicles.

CN Patent Application No. 105261753 A discloses an aqueous cathode slurry and a preparation method thereof. The aqueous cathode slurry comprises a cathode active material (25%-35%), a carbon nanotube (12%-20%), a conductive agent (6%-10%), an aqueous binder (4%-6%) and water (40%-50%). The method comprises mixing a binder with water to obtain a pre-mixed solution; adding a carbon nanotube and a conductive agent to the pre-mixed solution to obtain a conductive gel solution; milling the conductive gel solution until the milled material has a fineness from 5 µm to 10 µm; adding a cathode active material and more water to the milled conductive gel solution with mixing; vacuum pumping the slurry; leaving the slurry to stand for a while to obtain an aqueous cathode slurry. However, there is no data to evaluate the electrochemical performance of a battery using ternary transition metal oxide as a cathode active material.

In view of the above, there is always a need to develop a method for preparing cathode slurries having high nickel cathode material for lithium-ion batteries with good electrochemical performance using a simple, fast and environmentally friendly method.

SUMMARY OF THE INVENTION

The aforementioned needs are met by various aspects and embodiments disclosed herein.

In one aspect, provided herein is a method of preparing a cathode for a secondary battery, comprising the steps of:

1) dispersing a binder material and a conductive agent in an aqueous solvent to form a first suspension;

2) cooling the first suspension to a temperature from about −5° C. to about 20° C.;

3) adding a cathode active material into the first suspension to form a second suspension;

4) homogenizing the second suspension by a homogenizer at a temperature from about −5° C. to about 20° C. to obtain a homogenized slurry;

5) applying the homogenized slurry on a current collector to form a coated film on the current collector; and 6) drying the coated film on the current collector at a temperature from about 35° C. to about 65° C. to form the cathode, wherein the pH of the homogenized slurry is from about 7 to about 10 and wherein the total processing time for step 5) and 6) is less than 5 minutes.

In some embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof.

In certain embodiments, the salt of alginic acid comprises a cation selected from Na, Li, K, Ca, $NH_4$, Mg, Al, or a combination thereof.

In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

In certain embodiments, the aqueous solvent is selected from the group consisting of water, ethanol, isopropanaol, methanol, acetone, n-propanol, t-butanol, acetone, dimethyl ketone, methyl ethyl ketone, ethyl acetate, isopropyl acetate, propyl acetate, and combinations thereof.

In some embodiments, the first suspension is cooled to a temperature lower than 20° C., lower than 15° C., lower than 10° C., lower than 5° C., or lower than 0° C.

In certain embodiments, the cathode active material is selected from the group consisting of $Li_{1+x}Ni_aMn_bCo_cAl_{(1-a-b-c)}O_2$, $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, $LiNiO_2$, $LiMnO_2$, $LiMn_2O_4$, $Li_2MnO_3$, and combinations thereof; wherein $-0.2 \leq x \leq 0.2$, $0 \leq a < 1$, $0 \leq b < 1$, $0 \leq c < 1$, and $a+b+c \leq 1$.

In some embodiments, the cathode active material is selected from the group consisting of $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, $LiNiO_2$, $LiMnO_2$, $LiMn_2O_4$, $Li_2MnO_3$, and combinations thereof.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$.

In some embodiments, the second suspension is homogenized by a planetary stirring mixer, a stirring mixer, a blender, or an ultrasonicator.

In certain embodiments, the homogenization is performed under vacuum at a pressure from about 0.5 kPa to about 10 kPa.

In some embodiments, the second suspension is homogenized for about 0.5 hour to about 6 hours. In further embodiments, the second suspension is homogenized for a time period of less than 3 hours, less than 2 hours, or less than 1 hour.

In certain embodiments, the viscosity of the homogenized slurry is from about 1000 mPa·s to about 6000 mPa·s.

In some embodiments, the solid content of the homogenized slurry is from about 30% to about 60% by weight, based on the total weight of the homogenized slurry.

In certain embodiments, the homogenized slurry is applied on the current collector using a doctor blade coater, a slot-die coater, a transfer coater, or a spray coater.

In some embodiments, the coated film is dried by a conveyor hot air drying oven, a conveyor resistance drying oven, a conveyor inductive drying oven, or a conveyor microwave drying oven.

In certain embodiments, the coated film on the current collector is dried for a time period of less than 5 minutes, less than 4 minutes, or less than 3 minutes.

In some embodiments, the total processing time for steps 3)-6) is from about 2 hours to about 6 hours. In further embodiments, the total processing time for steps 3)-6) is less than 5 hours, less than 4 hours, or less than 3 hours.

DETAILED DESCRIPTION OF THE INVENTION

Figure 1:
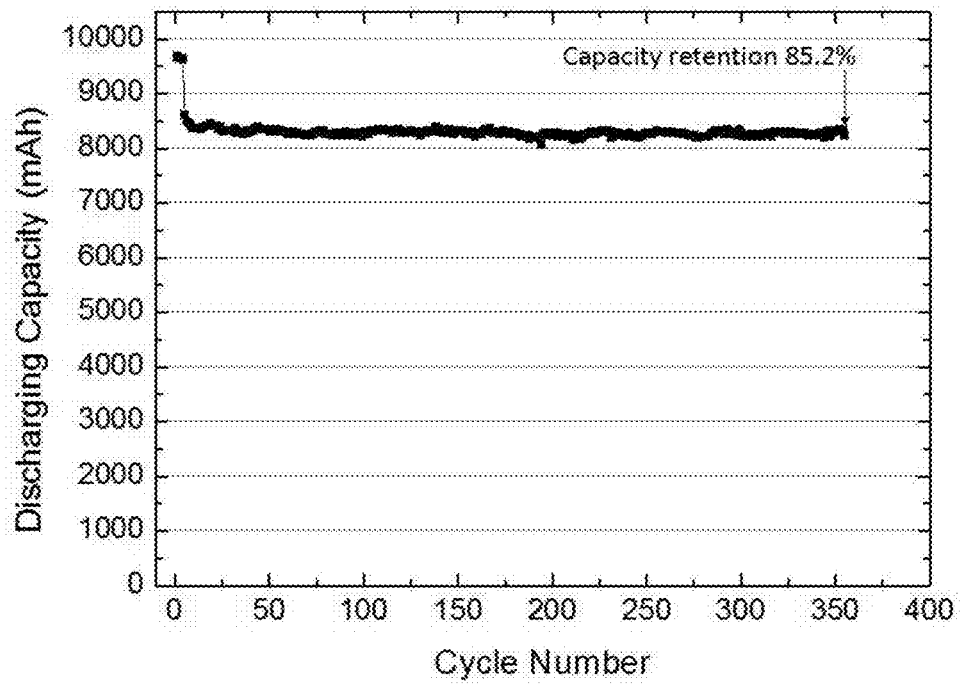
FIG. 1 depicts cyclability performance of an electrochemical cell prepared by the method described in Example 1.

Provided herein is a method of preparing a cathode for a secondary battery, comprising the steps of:

1) dispersing a binder material and a conductive agent in an aqueous solvent to form a first suspension;

2) cooling the first suspension to a temperature from about −5° C. to about 20° C.;

3) adding a cathode active material into the first suspension to form a second suspension;

4) homogenizing the second suspension by a homogenizer at a temperature from about −5° C. to about 20° C. to obtain a homogenized slurry;

5) applying the homogenized slurry on a current collector to form a coated film on the current collector; and 6) drying the coated film on the current collector at a temperature from about 35° C. to about 65° C. to form the cathode, wherein the pH of the homogenized slurry is from about 7 to about 10 and wherein the total processing time for step 5) and 6) is less than 5 minutes.

The term "electrode" refers to a "cathode" or an "anode."

The term "positive electrode" is used interchangeably with cathode. Likewise, the term "negative electrode" is used interchangeably with anode.

The term "binder material" refers to a chemical or a substance that can be used to hold the electrode material and conductive agent in place.

The term "conductive agent" refers to a material which is chemically inactive and has good electrical conductivity. Therefore, the conductive agent is often mixed with an electrode active material at the time of forming an electrode to improve electrical conductivity of the electrode.

The term "homogenizer" refers to an equipment that can be used for homogenization of materials. The term "homogenization" refers to a process of reducing a substance or material to small particles and distributing it uniformly throughout a fluid. Any conventional homogenizers can be used for the method disclosed herein. Some non-limiting examples of the homogenizer include stirring mixers, planetary stirring mixers, blenders and ultrasonicators.

The term "planetary mixer" refers to an equipment that can be used to mix or stir or blend different materials for producing a homogeneous mixture, which consists of blades conducting a planetary motion within a vessel. In some embodiments, the planetary mixer comprises at least one planetary blade and at least one high speed dispersion blade. The planetary and the high speed dispersion blades rotate on their own axes and also rotate continuously around the vessel. The rotation speed can be expressed in unit of rotations per minute (rpm) which refers to the number of rotations that a rotating body completes in one minute.

The term "applying" refers to an act of laying or spreading a substance on a surface.

The term "current collector" refers to a support for coating the electrode active material and a chemically inactive high electron conductor for keeping an electric current flowing to electrodes during discharging or charging a secondary battery.

The term "doctor blading" refers to a process for fabrication of large area films on rigid or flexible substrates. A coating thickness can be controlled by an adjustable gap width between a coating blade and a coating surface, which allows the deposition of variable wet layer thicknesses.

The term "transfer coating" or "roll coating" refers to a process for fabrication of large area films on rigid or flexible substrates. A slurry is applied on the substrate by transferring a coating from the surface of a coating roller with pressure. A coating thickness can be controlled by an adjustable gap width between a metering blade and a surface of the coating roller, which allows the deposition of variable wet layer thicknesses. In a metering roll system, the thickness of the coating is controlled by adjusting the gap between a metering roller and a coating roller.

The term "room temperature" refers to indoor temperatures from about 18° C. to about 30° C., e.g., 18, 19, 20, 21, 22, 23, 24, 25, 26, 27, 28, 29, or 30° C. In some embodiments, room temperature refers to a temperature of about 20° C.+/−1° C. or +/−2° C. or +/−3° C. In other embodiments, room temperature refers to a temperature of about 22° C. or about 25° C.

The term "solid content" refers to the amount of non-volatile material remaining after evaporation.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour or full energy in 10 hours; and a 5 C means utilization of full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is 1/1,000 of an ampere-hour.

The term "battery cycle life" refers to the number of complete charge/discharge cycles a battery can perform before its nominal capacity falls below 80% of its initial rated capacity.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: $R=R^L+k*(R^U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Generally, lithium-ion battery electrodes are manufactured by casting an organic based slurry onto a metallic current collector. The slurry contains electrode active material, conductive carbon, and binder in an organic solvent, most commonly N-Methyl-2-pyrrolidone (NMP). The binder, most commonly polyvinylidene fluoride (PVDF), is dissolved in the solvent, and conductive additives as well as the electrode active material are suspended in the slurry. PVDF provides a good electrochemical stability and high adhesion to the electrode materials and current collectors. However, PVDF can only dissolve in some specific organic solvents such as N-Methyl-2-pyrrolidone (NMP) which is flammable and toxic and hence requires specific handling.

An NMP recovery system must be in place during the drying process to recover NMP vapors. This will incur significant costs in the manufacturing process since it requires a large capital investment. The use of less expensive and environmentally friendly solvents, such as aqueous based solvents is preferred since it could eliminate the large capital cost of the recovery system. The attempts to replace the organic NMP based coating process by a water-based coating process have been successful for the negative electrode. A typical water-based slurry for anode coating comprises carboxymethyl cellulose (CMC) and styrene-butadiene rubber (SBR). Within the battery, cathodes are at high voltage. Whereas most rubbers including SBR are only stable at the low anode voltage and will decompose at high voltage. Therefore, contrary to anodes, water-based coating for cathodes is much more difficult.

Another concern of using water-based cathode coating is that many cathode materials are not inert in water. Lithium located near to the surface is reactive. It can dissolve (by ion exchange) or it can react with molecules within the atmosphere. If the slurry contains water as a solvent, then the reactive lithium will react with water, forming some inorganic surface compounds such as $Li_2CO_3$ and LiOH. Since the cathode materials containing these surface compounds are immersed in water, Li containing surface compounds such as $Li_2CO_3$ and LiOH dissolves and causes an increase of pH. Additionally Li near the surface can dissolve by an ion exchange reaction $Li^+$—$H^+$. Lithium may also diffuse from the bulk to the surface, creating cationic vacancies in the bulk.

This phenomenon will become more apparent when using high nickel cathode materials. This will affect the electrochemical properties of the cathode materials, introducing detrimental effects on battery performance. Therefore, conventional method of manufacturing an electrode, especially cathode with high nickel content uses an anhydrous organic solvent to prepare a slurry. The manufacturing processes are generally carried out in dry rooms where humidity of the environment is carefully controlled.

The present invention can provide a water-based lithium-ion battery cathode slurry comprising a cathode active material such as lithium transition metal oxide. In some embodiments, a binder material and a conductive agent are dispersed in an aqueous solvent to form a first suspension. In other embodiments, a first suspension is prepared by sequentially adding a binder material and conductive agent to an aqueous solvent.

The binder material in the slurry performs a role of binding the electrode active material and conductive agent together on the current collector. In some embodiments, the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof. In further embodiments, the salt of alginic acid comprises a cation selected from Na, Li, K, Ca, $NH_4$, Mg, Al, or a combination thereof.

In some embodiments, the binder material is selected from the group consisting of styrene-butadiene rubber (SBR), carboxymethyl cellulose (CMC), polyvinylidene fluoride (PVDF), acrylonitrile copolymer, polyacrylic acid (PAA), polyacrylonitrile, poly(vinylidene fluoride)-hexafluoropropene (PVDF-HFP), latex, a salt of alginic acid, and combinations thereof. In certain embodiments, the salt of alginic acid comprises a cation selected from Na, Li, K, Ca, $NH_4$, Mg, Al, or a combination thereof.

In certain embodiments, the binder material is selected from SBR, CMC, PAA, a salt of alginic acid, or a combination thereof. In certain embodiments, the binder material is acrylonitrile copolymer. In some embodiments, the binder material is polyacrylonitrile. In certain embodiments, the binder material is free of styrene-butadiene rubber, carboxymethyl cellulose, polyvinylidene fluoride, acrylonitrile copolymer, polyacrylic acid, polyacrylonitrile, poly(vinylidene fluoride)-hexafluoropropene, latex, or a salt of alginic acid. In certain embodiments, the binder material is not a fluorine-containing polymer such as PVDF, PVDF-HFP or PTFE.

In some embodiments, the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof. In certain embodiments, the conductive agent is not carbon, carbon black, graphite, expanded graphite, graphene, graphene nanoplatelets, carbon fibres, carbon nano-fibers, graphitized carbon flake, carbon tubes, carbon nanotubes, activated carbon, or mesoporous carbon.

In certain embodiments, the aqueous solution is a solution containing water as the major component and a volatile solvent, such as alcohols, lower aliphatic ketones, lower alkyl acetates or the like, as the minor component in addition to water. In certain embodiments, the amount of water is at least 50%, at least 55%, at least 60%, at least 65%, at least 70%, at least 75%, at least 80%, at least 85%, at least 90%, or at least 95% to the total amount of water and solvents other than water. In some embodiments, the amount of water is at most 55%, at most 60%, at most 65%, at most 70%, at most 75%, at most 80%, at most 85%, at most 90%, or at most 95% to the total amount of water and solvents other than water. In some embodiments, the first aqueous solution consists solely of water, that is, the proportion of water in the first aqueous solution is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_1$-$C_4$ alcohols, such as methanol, ethanol, isopropanol, n-propanol, butanol, and combinations thereof. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In some embodiments, the aqueous solution is a mixture of water and one or more water-miscible minor component. In certain embodiments, the aqueous solution is a mixture of water and a minor component selected from ethanol, isopropanol, n-propanol, t-butanol, n-butanol, and combinations thereof. In some embodiments, the volume ratio of water and the minor component is from about 51:49 to about 100:1.

In certain embodiments, the aqueous solution is water. Some non-limiting examples of water include tap water, bottled water, purified water, pure water, distilled water, deionized water, $D_2O$, or a combination thereof. In some embodiments, the aqueous solution is deionized water. In certain embodiments, the aqueous solution is free of alcohol, aliphatic ketone, alkyl acetate, or a combination thereof.

In some embodiments, the solid content of the first suspension is from about 10% to about 30%, from about 10% to about 25%, from about 10% to about 20%, or from about 10% to about 15% by weight, based on the total weight of the first suspension. In certain embodiments, the solid content of the first suspension is about 10%, about 15%, about 20%, about 25%, or about 30% by weight, based on the total weight of the first suspension.

During water-based coating the cathode material is exposed to water. Cyclability performance of lithium-ion batteries is dominated by the surface properties of the cathode material. Water can damage the surface of the cathode material, thereby causing poor cyclability performance.

In addition, when ternary cathode material such as NMC is immersed in water, a certain amount of Li will undergo ion exchange for protons. The dissolved Li causes an increase of the pH of the water. As the Ni:Mn ratio in NMC increases, the cathode capacity increases. However, as the Ni:Mn ratio increases the amount of Li available for ion exchange increases dramatically, resulting in an increased value for pH. Therefore, it would be very difficult to apply water-based electrode coatings to high Ni cathode materials.

This alkaline pH may also result in degradation of the current collector (e.g., corrosion and/or dissolution). A water-based slurry, especially if the Ni:Mn ratio in the ternary cathode material is high, is a relatively concentrated alkaline LiOH solution. The high pH of the water-based slurry may cause severe corrosion to the aluminum current collector foil since Al foil is not resistant to a corrosive attack by alkaline solutions having a high pH. Degradation of the collector may cause addition of undesirable impurities to the slurry and consequently decrease performance of the positive electrode.

Several strategies are proposed to solve the problems, for example lowering the pH of the slurry by adding a buffer or a pH modifier and coating the aluminum foil with protective coating. However, the pH value will increase again after adding the acid since the slurry has not reached a steady state. This phenomenon is typical for ternary cathode materials such as NCA and NMC with high Ni:Mn ratio. A main drawback of the protective coating is the relatively high cost of the coating. This is very difficult to realize under mass production conditions.

Moreover, the high pH of the slurry causes problems during coating as binding affinity of the binder is affected by pH. The occurrence of delamination or separation of the cathode electrode layer from the coated collector is detrimental. These problems has been solved by the present invention. In some embodiments, the first suspension is cooled to a temperature from about −5° C. to about 20° C. before adding a cathode active material into the first suspension to form a second suspension and the second suspension is homogenized by a homogenizer at a temperature from about −5° C. to about 20° C. to obtain a homogenized slurry.

It was surprisingly found that controlling the temperature of the first suspension and the subsequent homogenizing treatment can solve the above-mentioned problems. The temperature control of the first suspension and the subsequent homogenizing treatment can slow down the reaction of the cathode material with water and provide a simple method capable of preparing stable water-based slurry without the need of adding any additives.

In some embodiments, the first suspension is cooled to a temperature below room temperature. In certain embodiments, the first suspension is cooled to a temperature from about −5° C. to about 25° C., from about −5° C. to about 20° C., from about −5° C. to about 15° C., from about −5° C. to about 10° C., from about −5° C. to about 5° C., or from about −5° C. to about 0° C. In some embodiments, the first suspension is cooled to a temperature lower than 25° C., lower than 20° C., lower than 15° C., lower than 10° C., lower than 5° C., or lower than 0° C. In certain embodiments, the first suspension is cooled to a temperature of about 25° C., about 20° C., about 15° C., about 10° C., about 5° C., about 0° C., or about −5° C.

The method disclosed herein is particularly suitable for preparing a cathode using a cathode material with high nickel content. Cathode with high nickel content prepared by the method disclosed herein has improved electrochemical performance and long term stability when operated in a harsh condition such as a high temperature environment.

In some embodiments, the cathode active material is $Li_{1+x}Ni_aMn_bCo_cAl_{(1-a-b-c)}O_2$, $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, $LiNiO_2$, $LiMnO_2$, $LiMn_2O_4$, $Li_2MnO_3$, and combinations thereof; wherein $-0.2 \leq x \leq 0.2$, $0 \leq a < 1$, $0 \leq b < 1$, $0 \leq c < 1$, and $a+b+c \leq 1$. In certain embodiments, the cathode active material is selected from the group consisting of $Li_{1+x}Ni_aMn_bCo_cAl_{(1-a-b-c)}O_2$; wherein $-0.2 \leq x \leq 0.2$, $0 \leq a < 1$, $0 \leq b < 1$, $0 \leq c < 1$, and $a+b+c \leq 1$. In certain embodiments, the cathode active material is $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, and combinations thereof. In other embodiments, the cathode active material is not $LiNiO_2$, $LiMnO_2$, $LiMn_2O_4$, or $Li_2MnO_3$. In further embodiments, the cathode material is not $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, or $LiNi_{0.8}Co_{0.15}Al_{0.05}O_2$.

In certain embodiments, the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$. In other embodiments, the core and the shell each independently comprise two or more lithium transition metal oxides. The two or more lithium transition metal oxides in the core and the shell may be the same, or may be different or partially different. In some embodiments, the two or more lithium transition metal oxides are uniformly distributed over the core. In certain embodiments, the two or more lithium transition metal oxides are not uniformly distributed over the core.

In some embodiments, the diameter of the core is from about 5 µm to about 45 µm, from about 5 µm to about 35 µm, from about 5 µm to about 25 µm, from about 10 µm to about 40 µm, or from about 10 µm to about 35 µm. In certain embodiments, the thickness of the shell is from about 3 µm to about 15 µm, from about 15 µm to about 45 µm, from about 15 µm to about 30 µm, from about 15 µm to about 25 µm, from about 20 µm to about 30 µm, or from about 20 µm to about 35 µm. In certain embodiments, the diameter or thickness ratio of the core and the shell are in the range of 15:85 to 85:15, 25:75 to 75:25, 30:70 to 70:30, or 40:60 to 60:40. In certain embodiments, the volume or weight ratio of the core and the shell is 95:5, 90:10, 80:20, 70:30, 60:40, 50:50, 40:60, or 30:70.

The second suspension is homogenized by a homogenizer at a temperature from about −5° C. to about 20° C. to obtain a homogenized slurry. The homogenizer is equipped with a temperature control system where the temperature of the second suspension can be controlled by the temperature control system. Any homogenizer that can reduce or eliminate particle aggregation, and/or promote homogeneous distribution of slurry ingredients can be used herein. Homogeneous distribution plays an important role for fabricating batteries with good battery performance. In some embodiments, the homogenizer is a planetary stirring mixer, a stirring mixer, a blender, or an ultrasonicator.

In certain embodiments, the second suspension can be homogenized at any temperature below room temperature to obtain a homogenized slurry. In some embodiments, the second suspension is homogenized at a temperature from about −5° C. to about 25° C., from about −5° C. to about 20° C., from about −5° C. to about 15° C., from about −5° C. to about 10° C., from about −5° C. to about 5° C., or from about −5° C. to about 0° C. In certain embodiments, the second suspension is homogenized at a temperature lower than 25° C., lower than 20° C., lower than 15° C., lower than 10° C., lower than 5° C., or lower than 0° C. In some embodiments, the second suspension is homogenized at a temperature of about 25° C., about 20° C., about 15° C., about 10° C., about 5° C., about 0° C., or about −5° C. Lowering the temperature of the second suspension during homogenization can limit the occurrence of unwanted reactions of the cathode active material with the aqueous solvent.

In some embodiments, the planetary stirring mixer comprises at least one planetary blade and at least one high speed dispersion blade. In certain embodiments, the rotational speed of the planetary blade is from about 20 rpm to about 200 rpm and rotational speed of the dispersion blade is from about 1,000 rpm to about 3,500 rpm. In some embodiments, the rotational speed of the planetary blade is from about 20 rpm to about 200 rpm, from about 20 rpm to about 150 rpm, from about 30 rpm to about 150 rpm, or from about 50 rpm to about 100 rpm. The rotational speed of the dispersion blade is from about 1,000 rpm to about 4,000 rpm, from about 1,000 rpm to about 3,000 rpm, from about 1,000 rpm to about 2,000 rpm, from about 1,500 rpm to about 3,000 rpm, or from about 1,500 rpm to about 2,500 rpm.

In certain embodiments, the ultrasonicator is an ultrasonic bath, a probe-type ultrasonicator or an ultrasonic flow cell. In some embodiments, the ultrasonicator is operated at a power density from about 10 W/L to about 100 W/L, from about 20 W/L to about 100 W/L, from about 30 W/L to about 100 W/L, from about 40 W/L to about 80 W/L, from about 40 W/L to about 70 W/L, from about 40 W/L to about 50 W/L, from about 40 W/L to about 60 W/L, from about 50 W/L to about 60 W/L, from about 20 W/L to about 80 W/L, from about 20 W/L to about 60 W/L, or from about 20 W/L to about 40 W/L. In certain embodiments, the ultrasonicator is operated at a power density of about 10 W/L, about 20 W/L, about 30 W/L, about 40 W/L, about 50 W/L, about 60 W/L, about 70 W/L, about 80 W/L, about 90 W/L, or about 100 W/L.

In some embodiments, the second suspension is homogenized for about 0.5 hour to about 6 hours, from about 0.5 hour to about 5 hours, from about 0.5 hour to about 4 hours, from about 0.5 hour to about 3 hours, from about 0.5 hour to about 2 hours, or from about 0.5 hour to about 1 hour. In certain embodiments, the second suspension is homogenized for about less than 6 hours, less than 5 hours, less than 4 hours, less than 3 hours, less than 2 hours, or less than 1 hour. In some embodiments, the second suspension is homogenized for about 6 hours, about 5 hours, about 4 hours, about 3 hours, about 2 hours, about 1 hour, or about 0.5 hour.

When pH value of the slurry varies during homogenization and is outside of certain ranges, it may affect dispersion homogeneity and particle size distribution of the water-insoluble components, e.g., electrode active material and conductive agent in the slurry, thereby resulting in poor electrode performance. Accordingly, it is desirable to maintain the pH of the slurry during homogenization. It is found that the pH value of the slurry can remain stable when homogenization is carried out at low temperature. The invention provides cathode materials especially high Ni ternary cathode materials with improved water stability, showing lower tendencies for pH change when applied in the slurry.

In some embodiments, the pH of the homogenized slurry is from about 7 to about 10, from about 7 to about 9, from about 7 to about 8, from about 8 to about 9, or from about 9 to about 10. In certain embodiments, the pH of the homogenized slurry is less than 10, less than 9, or less than 8. In some embodiments, the pH of the homogenized slurry is about 7, about 8, about 9, or about 10.

In certain embodiments, the amount of each of the binder material and the conductive material in the first suspension is from about 1% to about 25%, from about 1% to about 15%, from about 1% to about 10%, from about 1% to about 5%, from about 3% to about 20%, from about 5% to about 20%, from about 5% to about 10%, from about 10% to about 20%, from about 10% to about 15%, or from about 15% to about 20% by weight, based on the total weight of the first suspension.

In some embodiments, the amount of each of the binder material and the conductive agent in the homogenized slurry is independently at least 1%, at least 2%, at least 3%, at least 4%, at least 5%, at least 10%, at least 15%, at least 20%, at least 25%, at least 30%, at least 35%, at least 40%, at least 45%, or at least 50% by weight, based on the total weight of the homogenized slurry. In certain embodiments, the amount of each of the binder and the conductive agent in the homogenized slurry is independently at most 1%, at most 2%, at most 3%, at most 4%, at most 5%, at most 10%, at most 15%, at most 20%, at most 25%, at most 30%, at most 35%, at most 40%, at most 45%, or at most 50% by weight, based on the total weight of the homogenized slurry.

In certain embodiments, the amount of the cathode active material in the homogenized slurry is at least 30%, at least 35%, at least 40%, at least 45%, at least 50%, at least 55%, at least 60%, at least 65%, at least 70%, at least 75%, at least 80%, at least 85%, at least 90%, or at least 95% by weight, based on the total weight of the homogenized slurry. In some embodiments, the amount of the cathode active material in the homogenized slurry is at most 50%, at most 55%, at most 60%, at most 65%, at most 70%, at most 75%, at most 80%, at most 85%, at most 90%, or at most 95% by weight, based on the total weight of the homogenized slurry.

In some embodiments, the amount of the cathode active material in the homogenized slurry is from about 30% to about 95%, from about 45% to about 95%, from about 50% to about 95%, from about 80% to about 95%, or from about 90% to about 95% by weight, based on the total weight of the homogenized slurry. In certain embodiments, the amount of the cathode active material in the homogenized slurry is about 30%, about 45%, about 50%, about 65%, about 70%, about 75%, about 80%, about 85%, about 90%, or about 95% by weight, based on the total weight of the homogenized slurry.

In certain embodiments, the solid content of the homogenized slurry is from about 30% to about 60%, from about 30% to about 55%, from about 30% to about 50%, from about 40% to about 60%, or from about 50% to about 60% by weight, based on the total weight of the homogenized slurry. In some embodiments, the solid content of homogenized slurry is about 30%, about 40%, about 50%, about 55%, or about 60% by weight, based on the total weight of the homogenized slurry.

High viscosity of the slurry makes it difficult to disperse the bulk materials to obtain a uniform slurry. The solvent used in the homogenized slurry disclosed herein can comprise at least one alcohol for the purposes of improving the processibility of the slurry. In some embodiments, the slurry does not comprise an alcohol. Non-limiting examples of suitable alcohol include ethanol, isopropanol, n-propanol, t-butanol, n-butanol, and combinations thereof. The total amount of the alcohol can range from about 10 wt. % to about 50 wt. %, from about greater than 0 to about 15 wt. %, from about 0.001 wt. % to about 10 wt. %, from about 0.01 wt. % to about 8 wt. %, or from about 0.1 wt. % to about 5 wt. % of the total weight of the slurry.

The viscosity of the slurry is preferably less than about 6,000 mPa·s. In some embodiments, the viscosity of the homogenized slurry is from about 1,000 mPa·s to about 6,000 mPa·s, from about 1,000 mPa·s to about 5,000 mPa·s, from about 1,000 mPa·s to about 4,000 mPa·s, from about 1,000 mPa·s to about 3,000 mPa·s, or from about 1,000 mPa·s to about 2,000 mPa·s. In certain embodiments, the viscosity of the homogenized slurry is less than 6,000 mPa·s, less than 5,000 mPa·s, less than 4,000 mPa·s, less than 3,000 mPa·s, or less than 2,000 mPa·s. In some embodiments, the viscosity of the homogenized slurry is about 1,000 mPa·s, about 2,000 mPa·s, about 3,000 mPa·s, about 4,000 mPa·s, about 5,000 mPa·s, or about 6,000 mPa·s. Thus, the resultant slurry can be fully mixed or homogeneous.

After uniform mixing of slurry components, the homogenized slurry can be applied on a current collector to form a coated film on the current collector. The current collector acts to collect electrons generated by electrochemical reactions of the cathode active material or to supply electrons required for the electrochemical reactions. In some embodiments, the current collector can be in the form of a foil, sheet or film. In certain embodiments, the current collector is stainless steel, titanium, nickel, aluminum, or electrically-conductive resin.

During coating, pH is a very important parameter in controlling the slurry stability. The risk of pH instability causes the need for the slurry to be coated immediately after homogenization. This is very difficult to realize under mass production conditions, where the coating processes often continue for many hours. If the pH changes then the key properties, for example viscosity and degree of dispersion, will also change. Any instability such as change of viscosity and degree of dispersion during coating will be a severe issue and the coating process will become unstable. Therefore, these key properties need to be very stable during homogenization and remain stable after homogenization for a long time.

Furthermore, the alkalinity of the slurry can also have a negative effect on the metallic current collector. For example, a highly alkaline pH can oxidize the current collector material such as Al. As a result, adhesion properties of the electrode components onto the collector may be reduced, resulting in the formation of an uneven coating having pinholes. The coated film is easily exfoliated, and also lacks durability, causing microscopic pinholes or cracks in the surface of the coating. Insufficient or uneven attachment of the coating material will also reduce electronic conduction of the positive electrode.

The corrosion can significantly reduce the lifetime of the battery. The slurry should have a stable pH. In some embodiments, the pH of the homogenized slurry is from about 8 to about 10. In certain embodiments, the pH change observed during homogenization is less than 0.5 pH unit, less than 0.4 pH unit, less than 0.3 pH unit, less than 0.2 pH unit, or less than 0.1 pH unit.

In some embodiments, the current collector has a thickness from about 6 μm to about 100 μm since thickness will affect the volume occupied by the current collector within a battery and the amount of the electrode active material and hence the capacity in the battery.

In certain embodiments, the coating process is performed using a doctor blade coater, a slot-die coater, a transfer coater, a spray coater, a roll coater, a gravure coater, a dip coater, or a curtain coater. In some embodiments, the thickness of the coated film on the current collector is from about 10 μm to about 300 μm, or from about 20 μm to about 100 μm.

Evaporating the solvent to create a dry porous electrode is needed to fabricate the battery. After applying the homogenized slurry on a current collector, the coated film on the current collector can be dried by a dryer to obtain the battery electrode. Any dryer that can dry the coated film on the current collector can be used herein. Some non-limiting examples of the dryer include a batch drying oven, a conveyor drying oven, and a microwave drying oven. Some non-limiting examples of the conveyor drying oven include a conveyor hot air drying oven, a conveyor resistance drying oven, a conveyor inductive drying oven, and a conveyor microwave drying oven.

In some embodiments, the conveyor drying oven for drying the coated film on the current collector includes one or more heating sections, wherein each of the heating sections is individually temperature controlled, and wherein each of the heating sections may include independently controlled heating zones.

In certain embodiments, the conveyor drying oven comprises a first heating section positioned on one side of the conveyor and a second heating section positioned on an opposing side of the conveyor from the first heating section, wherein each of the first and second heating sections independently comprises one or more heating elements and a temperature control system connected to the heating elements of the first heating section and the second heating section in a manner to monitor and selectively control the temperature of each heating section.

In some embodiments, the conveyor drying oven comprises a plurality of heating sections, wherein each heating section includes independent heating elements that are operated to maintain a constant temperature within the heating section.

In certain embodiments, each of the first and second heating sections independently has an inlet heating zone and an outlet heating zone, wherein each of the inlet and outlet heating zones independently comprises one or more heating elements and a temperature control system connected to the heating elements of the inlet heating zone and the outlet heating zone in a manner to monitor and selectively control the temperature of each heating zone separately from the temperature control of the other heating zones.

The coated film on the current collector should be dried at a temperature of approximately 60° C. or less in approximately 5 minutes or less. Drying the coated positive electrode at temperatures above 60° C. may result in undesirable decomposition of the cathode active material, altering the pH of the slurry and affecting performance of the positive electrode.

Furthermore, corrosion of the current collector can severely affect the performance of batteries, degrading cyclability and rate performance. Drying at a relatively low temperature of below about 60° C. for less than 5 minutes can reduce the corrosion of aluminum current collector.

In some embodiments, the coated film on the current collector can be dried at a temperature from about 30° C. to about 60° C. In certain embodiments, the coated film on the current collector can be dried at a temperature from about 30° C. to about 55° C., from about 30° C. to about 50° C., from about 30° C. to about 45° C., from about 30° C. to about 40° C., or from about 35° C. to about 40° C. In some embodiments, the coated film on the current collector is dried at a temperature less than 65° C., less than 60° C., less than 55° C., less than 50° C., less than 45° C., or less than 40° C. In some embodiments, the coated film on the current collector is dried at a temperature of about 60° C., about 55° C., about 50° C., about 45° C., about 40° C., or about 35° C. In some embodiments, the coated film on the current collector can be dried at a temperature from about 30° C. to about 40° C. In certain embodiments, the coated film on the current collector can be dried at a temperature of less than 40° C. The lower drying temperatures may avoid the undesirable decomposition of cathode material having high nickel and/or manganese content.

In certain embodiments, the conveyor moves at a speed from about 2 meters/minute to about 30 meters/minute, from about 2 meters/minute to about 25 meters/minute, from about 2 meters/minute to about 20 meters/minute, from about 2 meters/minute to about 16 meters/minute, from about 3 meters/minute to about 30 meters/minute, from about 3 meters/minute to about 20 meters/minute, or from about 3 meters/minute to about 16 meters/minute.

Controlling the conveyor length and speed can regulate the drying time of the coated film. In some embodiments, the coated film on the current collector can be dried for a time period from about 2 minutes to about 5 minutes, from about 2 minutes to about 4 minutes, from about 2 minutes to about 3 minutes, or from about 3 minutes to about 5 minutes. In certain embodiments, the coated film on the current collector can be dried for a time period of less than 5 minutes, less than 4 minutes, less than 3 minutes, or less than 2 minutes. In some embodiments, the coated film on the current collector can be dried for a time period of about 5 minutes, about 4 minutes, about 3 minutes, or about 2 minutes.

Since the cathode materials are sufficiently active to react with water chemically, it has been necessary to control the total processing time. In some embodiments, the total processing time for step 3)-6) is from about 2 hours to about 6 hours, from about 2 hours to about 5 hours, from about 2 hours to about 4 hours, or from about 2 hours to about 3 hours. In certain embodiments, the total processing time for step 3)-6) is less than 6 hours, less than 5 hours, less than 4 hours, or less than 3 hours. In some embodiments, the total processing time for step 3)-6) is about 6 hours, about 5 hours, about 4 hours, about 3 hours, or about 2 hours.

After the coated film on the current collector is dried, the battery electrode is formed. In some embodiments, the battery electrode is compressed mechanically in order to enhance the density of the electrode.

The method disclosed herein has the advantage that aqueous solvent can be used in the manufacturing process, which can save processing time and facilities by avoiding the need to handle or recycle hazardous organic solvents. Since aqueous solvent can be used in the present invention, the electrode would require less time and energy in the drying step. In addition, costs are reduced by simplifying the total process. Therefore, this method is especially suited for industrial processes because of its low cost and ease of handling.

A battery ages with use, and with time, even if not used. A battery's operating conditions affect the aging process. Temperature and charging voltages are some of the most relevant factors in aging. Exposing a battery to high temperatures may accelerate its aging. In general, a battery such as automotive battery is usually exposed to an elevated temperature when operating. It is common for an automotive battery to lose approximately 20%-30% of its initial battery capacity in the first year. No prior art document describes a method of preparing batteries with high temperature performance using an aqueous solvent system.

The combination of cathode slurries disclosed herein having low mixing temperature, reduced mixing times, controlled slurry pH, low drying temperatures, and decreased drying times significantly improves high temperature performance of the batteries. Batteries comprising positive electrodes prepared in accordance with the present invention show small loss of capacity during high temperature storage and high cycle stability at high temperature conditions. The development of water-based coating technology without deteriorating cyclability performance is achieved by the present invention.

In some embodiments, the electrode is able to retain at least about 90%, 91%, 92%, 93%, 94%, 95%, 96%, 97%, or 98% of its initial storage capacity after 300 cycles at a rate of 1C at 25° C. in a full cell. In certain embodiments, the electrode is able to retain at least about 90%, 91%, 92%, 93%, 94% or 95% of its initial storage capacity after 500 cycles at a rate of 1C at 25° C. in a full cell. In some embodiments, the electrode is able to retain at least about 85%, 86%, 87%, 88%, 89%, 90%, 91%, 92%, 93%, 94% or 95% of its initial storage capacity after 1,000 cycles at a rate of 1C at 25° C. in a full cell. In certain embodiments, the electrode is able to retain at least about 80%, 81%, 82%, 83%, 84%, 85%, 86%, 87%, 88%, 89% or 90% of its initial storage capacity after 1,500 cycles at a rate of 1C at 25° C. in a full cell. In some embodiments, the electrode is able to retain at least about 75%, 76%, 77%, 78%, 79%, 80%, 81%, 82%, 83%, 84% or 85% of its initial storage capacity after 2,000 cycles at a rate of 1C at 25° C. in a full cell.

The capacity retention of a battery also varies with storage temperature. If a battery is stored at high temperatures, the self-discharge will be accelerated. The battery disclosed herein shows good capacity retention that maintains more than 60% of the initial capacity after 2 weeks storage at an elevated temperature. In some embodiments, the capacity retention of the battery is not less than 50%, not less than 55%, not less than 60%, not less than 65%, or not less than 70% of its initial capacity after storage for 2 weeks at 60° C.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

The pH value of the slurry was measured by an electrode-type pH meter (ION 2700, Eutech Instruments). The viscosity of slurry was measured using a rotational viscosity meter (NDJ-5S, Shanghai JT Electronic Technology Co. Ltd., China).

Example 1

A) Preparation of Positive Electrode

A first suspension was prepared by dispersing 0.36 kg of carbon black (SuperP; obtained from Timcal Ltd, Bodio, Switzerland) and 0.36 kg polyacrylonitrile (PAN) (LA 132, Chengdu Indigo Power Sources Co., Ltd., China) in 3.6 L of deionized water while stirring with a 10 L planetary mixer (CMDJ-10L; obtained from ChienMei Co. Ltd., China), followed by cooling the mixture to 15° C. After the addition, the first suspension was further stirred for about 30 minutes at 15° C. at a planetary blade speed of 40 rpm and a dispersion blade speed of 2,500 rpm.

A second suspension was prepared by dispersing 8.28 kg of $LiNi_{0.8}Mn_{0.1}Co_{0.1}O_2$ (NMC811) (obtained from Henan Kelong NewEnergy Co., Ltd., Xinxiang, China) in the first suspension at 15° C. Thereafter, 2.4 L of deionized water is added to the second suspension to adjust its solid content. After adjusting the solid content, the second suspension was further stirred for about 2 hours at 15° C. at a planetary blade speed of 40 rpm and a dispersion blade speed of 2,500 rpm under a reduced pressure of 1000 Pa to obtain a cathode slurry. A cathode slurry formulation of 92 wt. % NMC811, 4 wt. % carbon black, and 4 wt. % PAN was prepared. The viscosity and pH of the slurry at 25° C. were 2,350 mPa·s and 9.7 respectively. The solid content of the cathode slurry was 60 wt. %.

Shortly after preparation, the cathode slurry was coated onto both sides of an aluminum foil having a thickness of 20 μm using a transfer coater with an area density of about 38 mg/cm². The coated films on the aluminum foil were dried for 3.5 minutes by a 24-meter-long conveyor hot air drying oven as a sub-module of the transfer coater operated at a conveyor speed of about 6.8 meters/minute at about 40° C. to obtain a positive electrode. The electrode was then pressed to increase the density of the coating and the density was 2.98 g/cm³.

B) Preparation of Negative Electrode

A negative electrode slurry was prepared by mixing 90 wt. % of hard carbon (HC; purity of 99.5%, obtained from Ruifute Technology Ltd., Shenzhen, Guangdong, China) with 1.5 wt. % carboxymethyl cellulose (CMC, BSH-12, DKS Co. Ltd., Japan) and 3.5 wt. % SBR (AL-2001, NIPPON A&L INC., Japan) as a binder, and 5 wt. % carbon black as a conductive agent in deionized water. The solid content of the anode slurry was 50 wt. %. The slurry was coated onto both sides of a copper foil having a thickness of 9 μm using a transfer coater with an area density of about 19 mg/cm². The coated films on the copper foil were dried at about 50° C. for 2.4 minutes by a 24-meter-long conveyor hot air dryer operated at a conveyor speed of about 10 meters/minute to obtain a negative electrode. The electrode was then pressed to increase the density of the coating and the density was 1.8 g/cm³.

C) Assembling of Pouch-Type Battery

After drying, the resulting cathode film and anode film were used to prepare the cathode and anode respectively by cutting into individual electrode plates. A pouch-type battery was assembled by stacking the cathode and anode electrode plates alternatively and then packaged in a case made of an aluminum-plastic laminated film. The cathode and anode electrode plates were kept apart by separators and the case was pre-formed. The separator was a ceramic coated microporous membrane made of nonwoven fabric (SEPARION, Evonik Industries, Germany), which had a thickness of about 35 μm. An electrolyte was then filled into the case holding the packed electrodes in high-purity argon atmosphere with moisture and oxygen content less than 1 ppm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. After electrolyte filling, the pouch-type battery was vacuum sealed and then mechanically pressed using a punch tooling with standard square shape. The electrochemical performance of the pouch-type battery of Example 1 was measured and is shown in Table 2 below. Test result of cyclability performance is shown in FIG. 1.

Example 2

A) Preparation of Positive Electrode

A first suspension was prepared by dispersing 0.3 kg of carbon black and 0.3 kg of PAN in 4.5 L of deionized water while stirring with a 10 L planetary mixer, followed by cooling the mixture to 10° C. After the addition, the first suspension was further stirred for about 30 minutes at 10° C. at a planetary blade speed of 40 rpm and a dispersion blade speed of 2,500 rpm.

A second suspension was prepared by dispersing 6.9 kg of NMC811 in the first suspension at 10° C. Thereafter, 3 L of deionized water is added to the second suspension to adjust its solid content. After adjusting the solid content, the second suspension was further stirred for about 2.5 hours at 10° C. at a planetary blade speed of 40 rpm and a dispersion blade speed of 2,500 rpm under a reduced pressure of 1,000 Pa to obtain a cathode slurry. A cathode slurry formulation of 92 wt. % NMC811, 4 wt. % carbon black, and 4 wt. % PAN was prepared. The viscosity and pH of the slurry at 25° C. were 2,760 mPa·s and 10.3 respectively. The solid content of the cathode slurry was 50 wt. %.

Shortly after preparation, the cathode slurry was coated onto both sides of an aluminum foil having a thickness of 20 μm using a transfer coater with an area density of about 38 mg/cm². The coated films on the aluminum foil were dried for 4.2 minutes by a 24-meter-long conveyor hot air drying oven as a sub-module of the transfer coater operated at a conveyor speed of about 5.7 meters/minute and about 37° C.

to obtain a positive electrode. The electrode was then pressed to increase the density of the coating and the density was 2.85 g/cm$^3$.

B) Preparation of Negative Electrode

A negative electrode slurry was prepared by mixing 90 wt. % of hard carbon with 5 wt. % PAN and 5 wt. % carbon black in deionized water. The solid content of the anode slurry was 50 wt. %. The slurry was coated onto both sides of a copper foil having a thickness of 9 μm using a transfer coater with an area density of about 19 mg/cm$^2$. The coated films on the copper foil were dried at about 50° C. for 2.4 minutes by a 24-meter-long conveyor hot air dryer operated at a conveyor speed of about 10 meters/minute to obtain a negative electrode. The electrode was then pressed to increase the density of the coating and the density was 1.8 g/cm$^3$.

C) Assembling of Pouch-Type Battery

Figure 2:
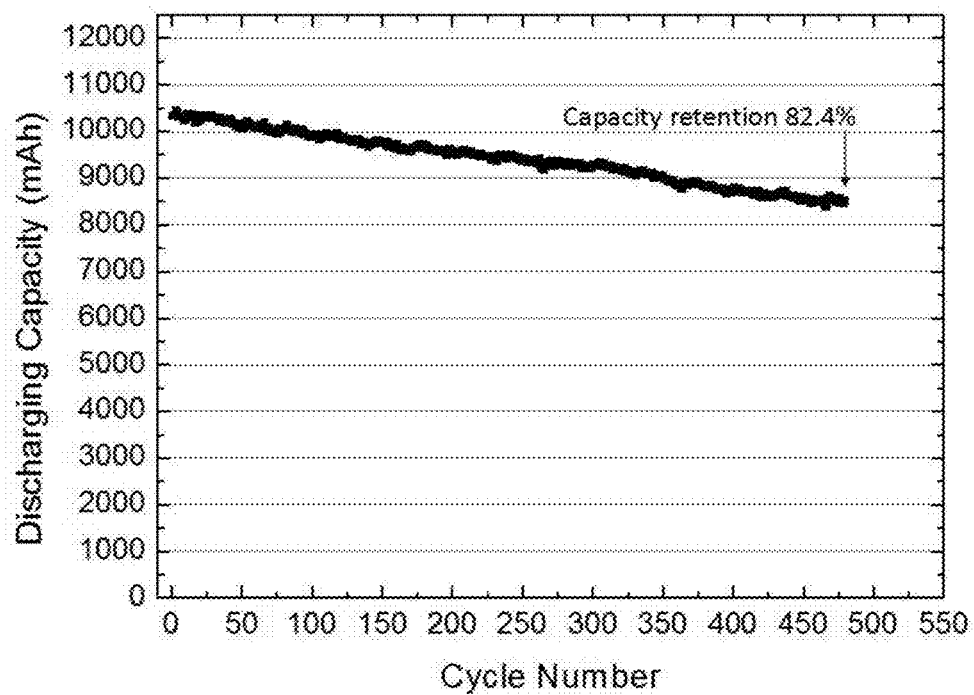
FIG. 2 depicts cyclability performance of an electrochemical cell prepared by the method described in Example 2.

A pouch type battery cell was assembled in the same manner as in Example 1. The electrochemical performance of the pouch-type battery of Example 2 was measured and is shown in Table 2 below. Test result of cyclability performance is shown in FIG. 2.

Example 3

A) Preparation of Positive Electrode

A positive electrode slurry was prepared in the same manner as in Example 2, except that the first suspension was prepared at 0° C.; the solid content of the second suspension was adjusted by adding a mixture of deionized water and ethanol in a weight ratio of 2:1; and the second suspension was homogenized by a circulating ultrasonic flow cell (NP8000, obtained from Guangzhou Newpower Ultrasonic Electronic Equipment Co., Ltd., China) at 0° C. for 3.5 hours. The viscosity and pH of the slurry at 25° C. were 2,200 mPa·s and 10.0 respectively. The solid content of the cathode slurry was 50 wt. %. The formulation of Example 3 is shown in Table 1 below.

Shortly after preparation, the cathode slurry was coated onto both sides of an aluminum foil having a thickness of 20 μm using a transfer coater with an area density of about 38 mg/cm$^2$. The coated films on the aluminum foil were dried for 3.2 minutes by a 24-meter-long conveyor hot air drying oven as a sub-module of the transfer coater operated at a conveyor speed of about 7.5 meters/minute and about 45° C. to obtain a positive electrode. The electrode was then pressed to increase the density of the coating and the density was 2.91 g/cm$^3$.

B) Preparation of Negative Electrode

A negative electrode slurry was prepared in the same manner as in Example 2.

C) Assembling of Pouch-Type Battery

Figure 3:
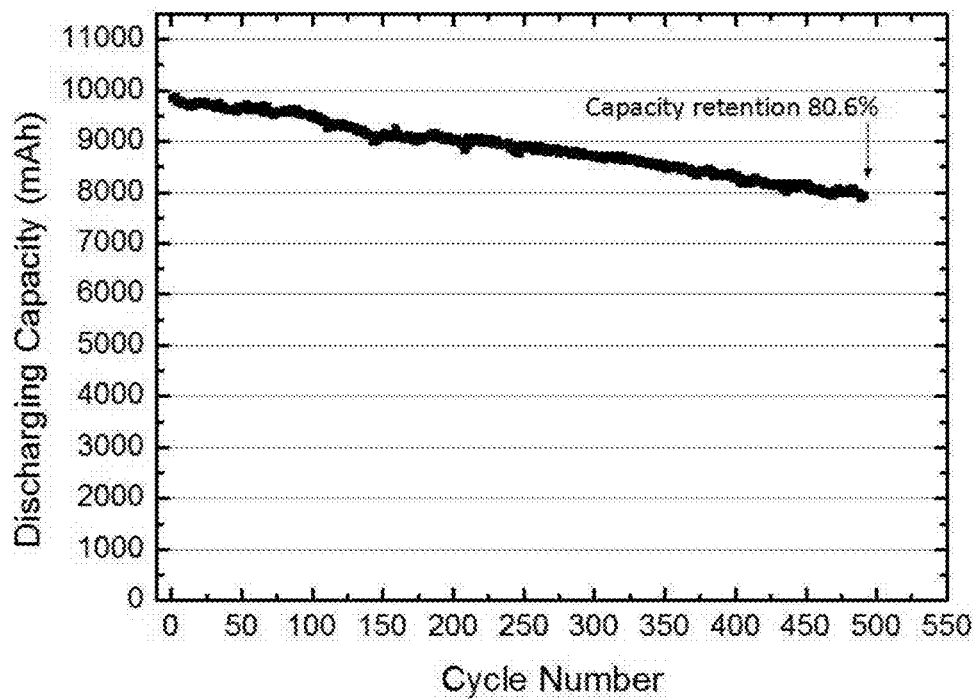
FIG. 3 depicts cyclability performance of an electrochemical cell prepared by the method described in Example 3.

A pouch type battery cell was assembled in the same manner as in Example 1. The electrochemical performance of the pouch-type battery of Example 3 was measured and is shown in Table 2 below. Test result of cyclability performance is shown in FIG. 3.

Example 4

A first suspension was prepared by dispersing 0.29 kg of carbon black and 0.29 kg of PAN in 4.05 L of deionized water while stirring with a 10 L planetary mixer, followed by cooling the mixture to 15° C. After the addition, the first suspension was further stirred for about 30 minutes at 15° C. at a planetary blade speed of 40 rpm and a dispersion blade speed of 2,500 rpm.

A second suspension was prepared by dispersing 7.67 kg of Li$_{1.0}$Ni$_{0.8}$Co$_{0.15}$Al$_{0.05}$O$_2$ (NCA) (obtained from Hunan Rui Xiang New Material Co., Ltd., Changsha, China) in the first suspension at 15° C. Thereafter, 2.7 L of deionized water is added to the second suspension to adjust its solid content. After adjusting the solid content, the second suspension was further stirred for about 2.5 hours at 15° C. at a planetary blade speed of 40 rpm and a dispersion blade speed of 2,500 rpm under a reduced pressure of 1,000 Pa to obtain a cathode slurry. A cathode slurry formulation of 93 wt. % NCA, 3.5 wt. % carbon black, and 3.5 wt. % PAN was prepared. The viscosity and pH of the slurry at 25° C. were 3,350 mPa·s and 10.2 respectively. The solid content of the cathode slurry was 55 wt. %.

Shortly after preparation, the homogenized slurry was coated onto both sides of an aluminum foil having a thickness of 20 μm using a transfer coater with an area density of about 38 mg/cm$^2$. The coated films on the aluminum foil were dried for 4.5 minutes by a 24-meter-long conveyor hot air drying oven as a sub-module of the transfer coater operated at a conveyor speed of about 5.3 meters/minute and about 35° C. to obtain a positive electrode. The electrode was then pressed to increase the density of the coating and the density was 3.3 g/cm$^3$.

B) Preparation of Negative Electrode

A negative electrode slurry was prepared in the same manner as in Example 1.

C) Assembling of Pouch-Type Battery

Figure 4:
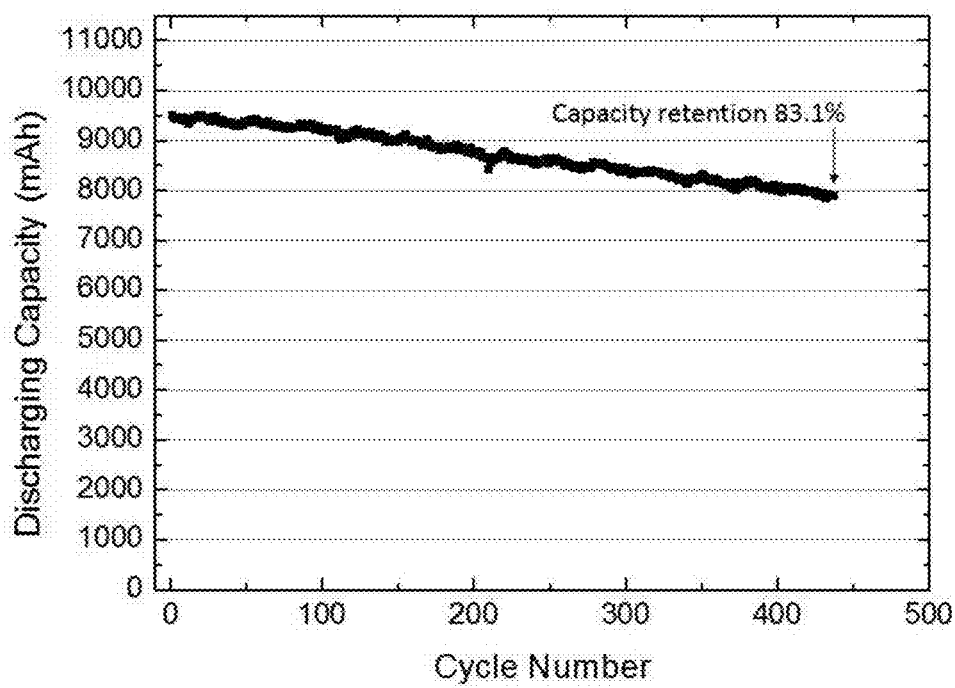
FIG. 4 depicts cyclability performance of an electrochemical cell prepared by the method described in Example 4.

A pouch type battery cell was assembled in the same manner as in Example 1. The electrochemical performance of the pouch-type battery of Example 4 was measured and is shown in Table 2 below. Test result of cyclability performance is shown in FIG. 4.

Example 5

A) Preparation of Positive Electrode

A first suspension was prepared by dispersing 0.26 kg of carbon black and 0.26 kg of PAN in 4.5 L of deionized water while stirring with a 10 L planetary mixer, followed by cooling the mixture to 10° C. After the addition, the first suspension was further stirred for about 30 minutes at 10° C. at a planetary blade speed of 40 rpm and a dispersion blade speed of 2,500 rpm.

A second suspension was prepared by dispersing 6.98 kg of NCA in the first suspension at 10° C. Thereafter, 3 L of deionized water is added to the second suspension to adjust its solid content. After adjusting the solid content, the second suspension was further stirred for about 3.2 hours at 10° C. at a planetary blade speed of 40 rpm and a dispersion blade speed of 2,500 rpm under a reduced pressure of 1,000 Pa to obtain a cathode slurry. A cathode slurry formulation of 93 wt. % NCA, 3.5 wt. % carbon black, and 3.5 wt. % PAN was prepared. The viscosity and pH of the slurry at 25° C. were 2,980 mPa·s and 9.5 respectively. The solid content of the cathode slurry was 50 wt. %.

Shortly after preparation, the homogenized slurry was coated onto both sides of an aluminum foil having a thickness of 20 μm using a transfer coater with an area density of about 38 mg/cm$^2$. The coated films on the aluminum foil were dried for 3.1 minutes by a 24-meter-long conveyor hot air drying oven as a sub-module of the transfer coater operated at a conveyor speed of about 7.7 meters/minute and about 50° C. to obtain a positive electrode. The electrode was then pressed to increase the density of the coating and the density was 3.1 g/cm$^3$.

B) Preparation of Negative Electrode

A negative electrode slurry was prepared in the same manner as in Example 2.

C) Assembling of Pouch-Type Battery

Figure 5:
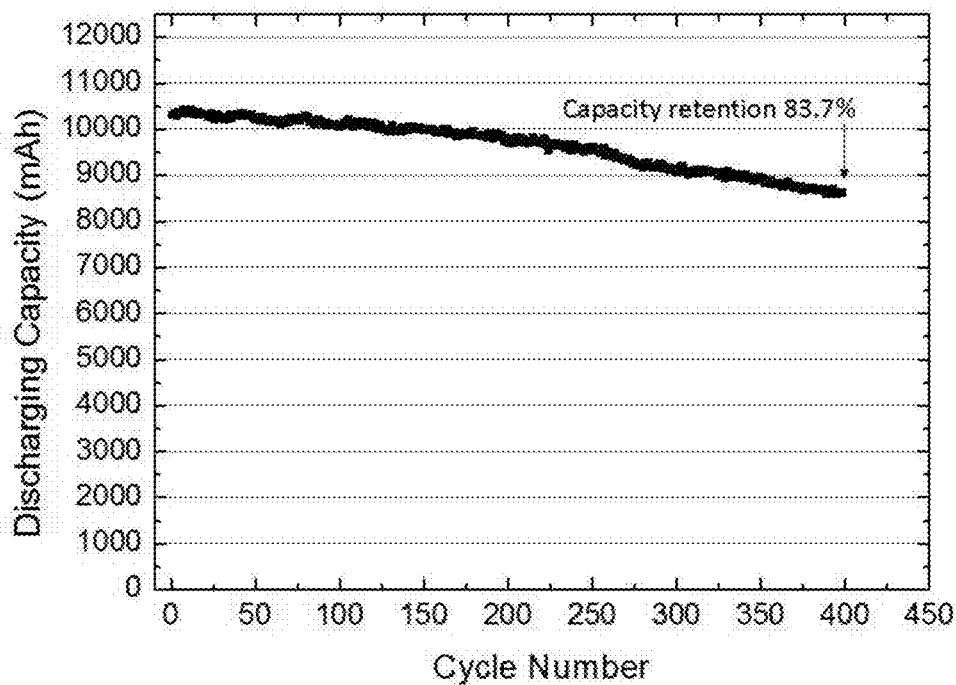
FIG. 5 depicts cyclability performance of an electrochemical cell prepared by the method described in Example 5.

A pouch type battery cell was assembled in the same manner as in Example 1. The electrochemical performance of the pouch-type battery of Example 5 was measured and is shown in Table 2 below. Test result of cyclability performance is shown in FIG. 5.

Example 6

A) Preparation of Positive Electrode

A positive electrode slurry was prepared in the same manner as in Example 5, except that the first suspension was prepared at 0° C.; the solid content of the second suspension was adjusted by adding a mixture of deionized water and isopropanol (IPA) in a weight ratio of 2:1; and the second suspension was homogenized by a circulating ultrasonic flow cell (NP8000, obtained from Guangzhou Newpower Ultrasonic Electronic Equipment Co., Ltd., China) at 0° C. for 4 hours. The viscosity and pH of the slurry at 25° C. were 2,060 mPa·s and 9.9 respectively. The solid content of the cathode slurry was 50 wt. %. The formulation of Example 6 is shown in Table 1 below.

Shortly after preparation, the homogenized slurry was coated onto both sides of an aluminum foil having a thickness of 20 μm using a transfer coater with an area density of about 38 mg/cm$^2$. The coated films on the aluminum foil were dried for 3.7 minutes by a 24-meter-long conveyor hot air drying oven as a sub-module of the transfer coater operated at a conveyor speed of about 6.5 meters/minute and about 42° C. to obtain a positive electrode. The electrode was then pressed to increase the density of the coating and the density was 2.95 g/cm$^3$.

B) Preparation of Negative Electrode

A negative electrode slurry was prepared in the same manner as in Example 2.

C) Assembling of Pouch-Type Battery

Figure 6:
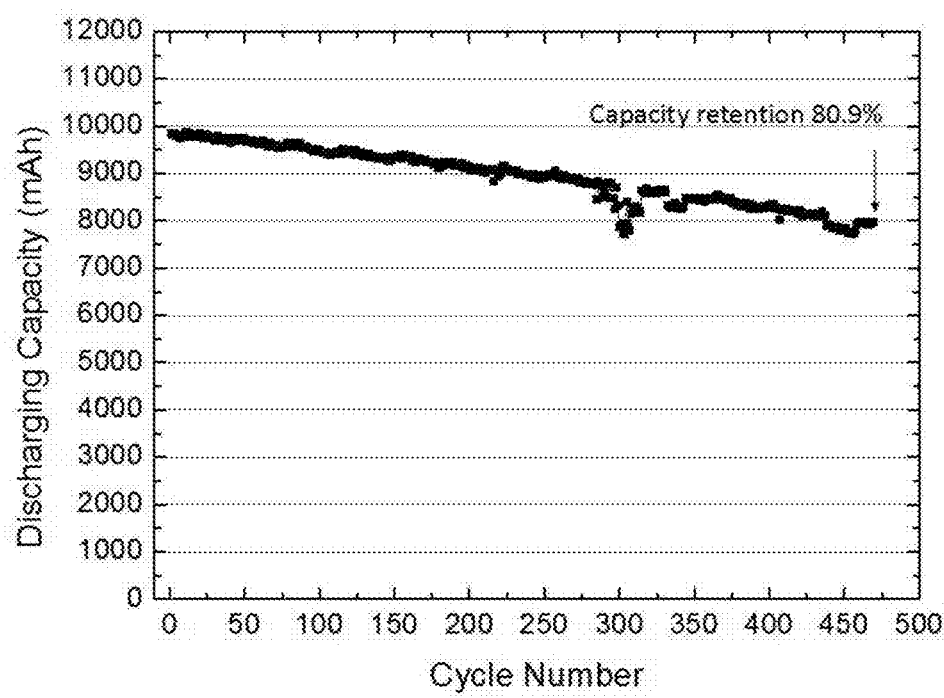
FIG. 6 depicts cyclability performance of an electrochemical cell prepared by the method described in Example 6.

A pouch type battery cell was assembled in the same manner as in Example 1. The electrochemical performance of the pouch-type battery of Example 6 was measured and is shown in Table 2 below. Test result of cyclability performance is shown in FIG. 6.

Example 7

A) Preparation of Positive Electrode

A first suspension was prepared by dispersing 0.3 kg of carbon black and 0.3 kg of PAN in 4.5 L of deionized water while stirring with a 10 L planetary mixer, followed by cooling the mixture to 10° C. After the addition, the first suspension was further stirred for about 30 minutes at 10° C. at a planetary blade speed of 40 rpm and a dispersion blade speed of 2,500 rpm.

A second suspension was prepared by dispersing 6.9 kg of $Li_{1.0}Ni_{0.6}Mn_{0.2}Co_{0.2}O_2$ (NMC622) (obtained from Hunan Rui Xiang New Material Co., Ltd., Changsha, China) in the first suspension at 10° C. Thereafter, 3 L of deionized water is added to the second suspension to adjust its solid content. After adjusting the solid content, the second suspension was further stirred for about 4 hours at 10° C. at a planetary blade speed of 40 rpm and a dispersion blade speed of 2,500 rpm under a reduced pressure of 1,000 Pa to obtain a cathode slurry. A cathode slurry formulation of 92 wt. % NMC622, 4 wt. % carbon black, and 4 wt. % PAN was prepared. The viscosity and pH of the slurry at 25° C. were 2,110 mPa·s and 9.1 respectively. The solid content of the cathode slurry was 50 wt. %.

Shortly after preparation, the homogenized slurry was coated onto both sides of an aluminum foil having a thickness of 20 μm using a transfer coater with an area density of about 38 mg/cm$^2$. The coated films on the aluminum foil were dried for 4 minutes by a 24-meter-long conveyor hot air drying oven as a sub-module of the transfer coater operated at a conveyor speed of about 6 meters/minute and about 45° C. to obtain a positive electrode. The electrode was then pressed to increase the density of the coating and the density was 2.85 g/cm$^3$.

B) Preparation of Negative Electrode

A negative electrode slurry was prepared in the same manner as in Example 2.

C) Assembling of Pouch-Type Battery

Figure 7:
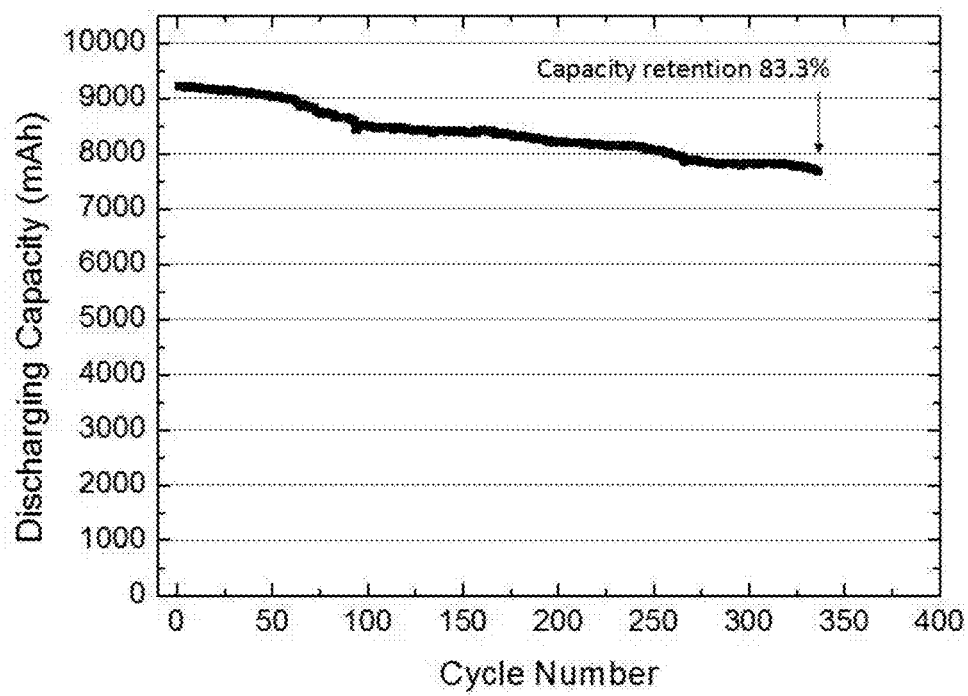
FIG. 7 depicts cyclability performance of an electrochemical cell prepared by the method described in Example 7.

A pouch type battery cell was assembled in the same manner as in Example 1. The electrochemical performance of the pouch-type battery of Example 7 was measured and is shown in Table 2 below. Test result of cyclability performance is shown in FIG. 7.

Example 8

A) Preparation of Positive Electrode

A positive electrode slurry was prepared in the same manner as in Example 7, except that a core-shell cathode material (C-S LNMgO) was used instead of NMC622 as a cathode material. The core of the core-shell cathode material was $Li_{1.01}Ni_{0.96}Mg_{0.04}O_2$ (LNMgO) and was prepared by solid state reaction in which MgO and $NiO_x$ (x=1 to 2) were mixed with LiOH followed by calcination at 850° C. The shell of the core-shell cathode material was $Li_{0.95}Co_{1.1}O_2$ and was prepared by forming a precipitate of $Co(OH)_2$ on the surface of the core to form a precursor, mixing the precursor with $Li_2CO_3$ (obtained from Tianqi Lithium, Shenzhen, China) to obtain a mixture, and calcinating the mixture at 800° C. The calcinated product was crushed by a jet mill (LNJ-6A, obtained from Mianyang Liuneng Powder Equipment Co., Ltd., Sichuan, China) for about 1 hour, followed by passing the crushed product through a 270-mesh sieve to obtain a cathode material having a particle size D50 of about 33 μm. The content of cobalt in the core-shell cathode material gradiently decreased from the outer surface of the shell to the inner core. The thickness of the shell was about 5 μm. The viscosity and pH of the prepared slurry at 25° C. were 2,650 mPa·s and 8.9 respectively. The solid content of the cathode slurry was 50 wt. %. The formulation of Example 8 is shown in Table 1 below.

Shortly after preparation, the homogenized slurry was coated onto both sides of an aluminum foil having a thickness of 20 μm using a transfer coater with an area density of about 38 mg/cm$^2$. The coated films on the aluminum foil were dried for 4 minutes by a 24-meter-long conveyor hot air drying oven as a sub-module of the transfer coater operated at a conveyor speed of about 6 meters/minute and about 45° C. to obtain a positive electrode. The electrode was then pressed to increase the density of the coating and the density was 2.78 g/cm$^3$.

B) Preparation of Negative Electrode

A negative electrode slurry was prepared in the same manner as in Example 2.

C) Assembling of Pouch-Type Battery

Figure 8:
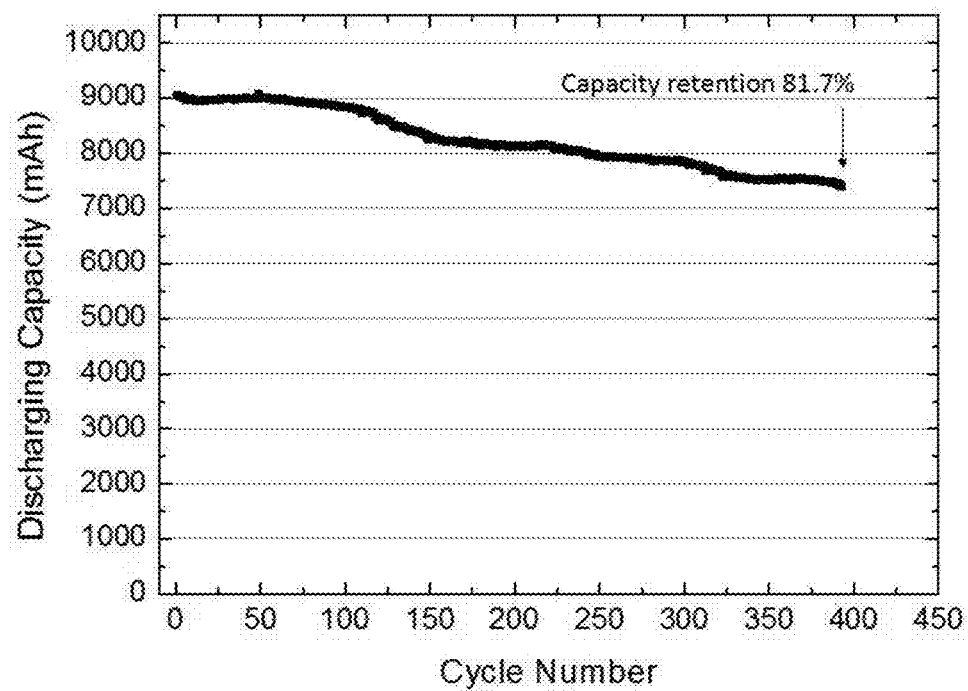
FIG. 8 depicts cyclability performance of an electrochemical cell prepared by the method described in Example 8.

A pouch type battery cell was assembled in the same manner as in Example 1. The electrochemical performance of the pouch-type battery of Example 8 was measured and is shown in Table 2 below. Test result of cyclability performance is shown in FIG. 8.

Comparative Example 1

A) Preparation of Positive Electrode

A positive electrode slurry was prepared in the same manner as in Example 1, except that the first suspension was prepared at 25° C.; and the second suspension was homogenized by a circulating ultrasonic flow cell at 25° C. for 5 hours. The viscosity and pH of the slurry at 25° C. were 2,450 mPa·s and 9.4 respectively. The solid content of the cathode slurry was 60 wt. %. The formulation of Comparative Example 1 is shown in Table 1 below.

Shortly after preparation, the homogenized slurry was coated onto both sides of an aluminum foil having a thickness of 20 μm using a transfer coater with an area density of about 38 mg/cm$^2$. The coated films on the aluminum foil were dried for 5 minutes by a 24-meter-long conveyor hot air drying oven as a sub-module of the transfer coater operated at a conveyor speed of about 4.8 meters/minute and about 60° C. temperature to obtain a positive electrode. The electrode was then pressed to increase the density of the coating and the density was 2.96 g/cm$^3$.

B) Preparation of Negative Electrode

A negative electrode slurry was prepared in the same manner as in Example 2.

C) Assembling of Pouch-Type Battery

Figure 9:
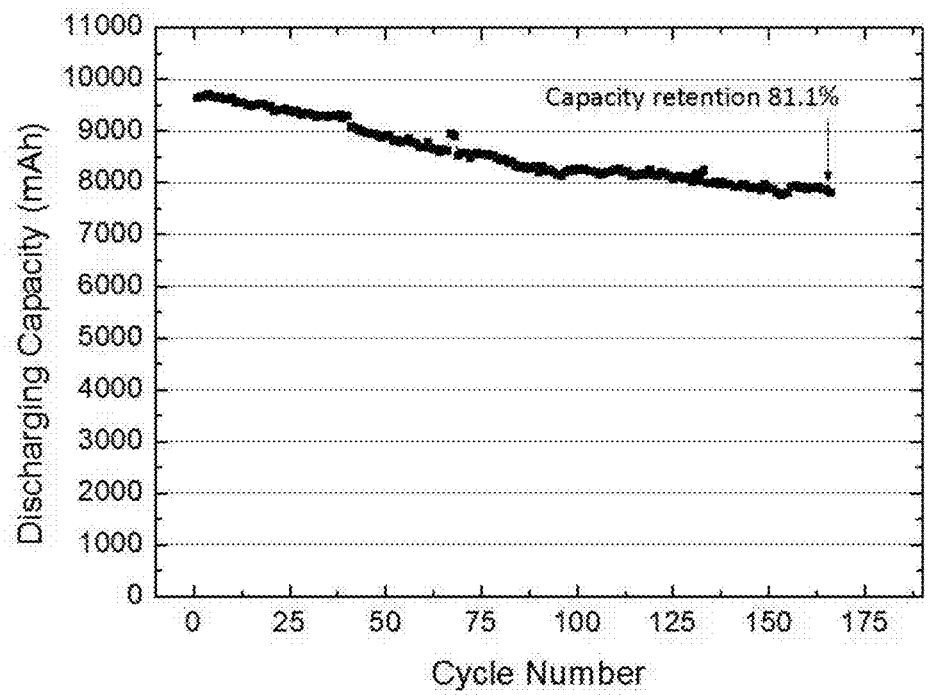
FIG. 9 depicts cyclability performance of an electrochemical cell prepared by the method described in Comparative Example 1.

A pouch type battery cell was assembled in the same manner as in Example 1. The electrochemical performance of the pouch-type battery of Comparative Example 1 was measured and is shown in Table 2 below. Test result of cyclability performance is shown in FIG. 9.

Comparative Example 2

A) Preparation of Positive Electrode

A positive electrode slurry was prepared in the same manner as in Example 1, except that the first suspension was prepared at 40° C.; and the second suspension was homogenized at 40° C. for 6 hours. The viscosity and pH of the slurry at 25° C. were 2,670 mPa·s and 9.6 respectively. The solid content of the cathode slurry was 60 wt. %. The formulation of Comparative Example 2 is shown in Table 1 below.

Shortly after preparation, the cathode slurry was coated onto both sides of an aluminum foil having a thickness of 20 μm using a transfer coater with an area density of about 38 mg/cm$^2$. The coated films on the aluminum foil were dried for 5 minutes by a 24-meter-long conveyor hot air drying oven as a sub-module of the transfer coater operated at a conveyor speed of about 4.8 meters/minute and about 70° C. to obtain a positive electrode. The electrode was then pressed to increase the density of the coating and the density was 2.86 g/cm$^3$.

B) Preparation of Negative Electrode

A negative electrode slurry was prepared in the same manner as in Example 2.

C) Assembling of Pouch-Type Battery

Figure 10:
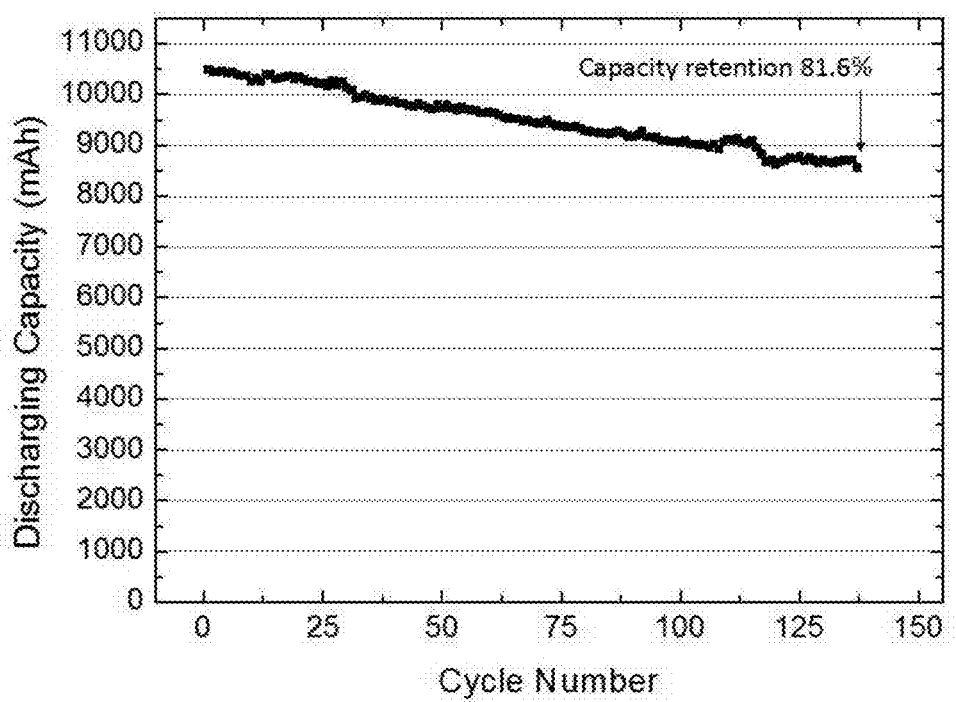
FIG. 10 depicts cyclability performance of an electrochemical cell prepared by the method described in Comparative Example 2.

A pouch type battery cell was assembled in the same manner as in Example 1. The electrochemical performance of the pouch-type battery of Comparative Example 2 was measured and is shown in Table 2 below. Test result of cyclability performance is shown in FIG. 10.

Comparative Example 3

A) Preparation of Positive Electrode

A positive electrode slurry was prepared in the same manner as in Example 4, except that the first suspension was prepared at 25° C.; and the second suspension was homogenized at 25° C. for 5 hours. The viscosity and pH of the slurry at 25° C. were 3,050 mPa·s and 10.4 respectively. The solid content of the cathode slurry was 55 wt. %. The formulation of Comparative Example 3 is shown in Table 1 below.

Shortly after preparation, the homogenized slurry was coated onto both sides of an aluminum foil having a thickness of 20 μm using a transfer coater with an area density of about 38 mg/cm$^2$. The coated films on the aluminum foil were dried for 5 minutes by a 24-meter-long conveyor hot air drying oven as a sub-module of the transfer coater operated at a conveyor speed of about 4.8 meters/minute and about 55° C. to obtain a positive electrode. The electrode was then pressed to increase the density of the coating and the density was 3.05 g/cm$^3$.

B) Preparation of Negative Electrode

A negative electrode slurry was prepared in the same manner as in Example 2.

C) Assembling of Pouch-Type Battery

Figure 11:
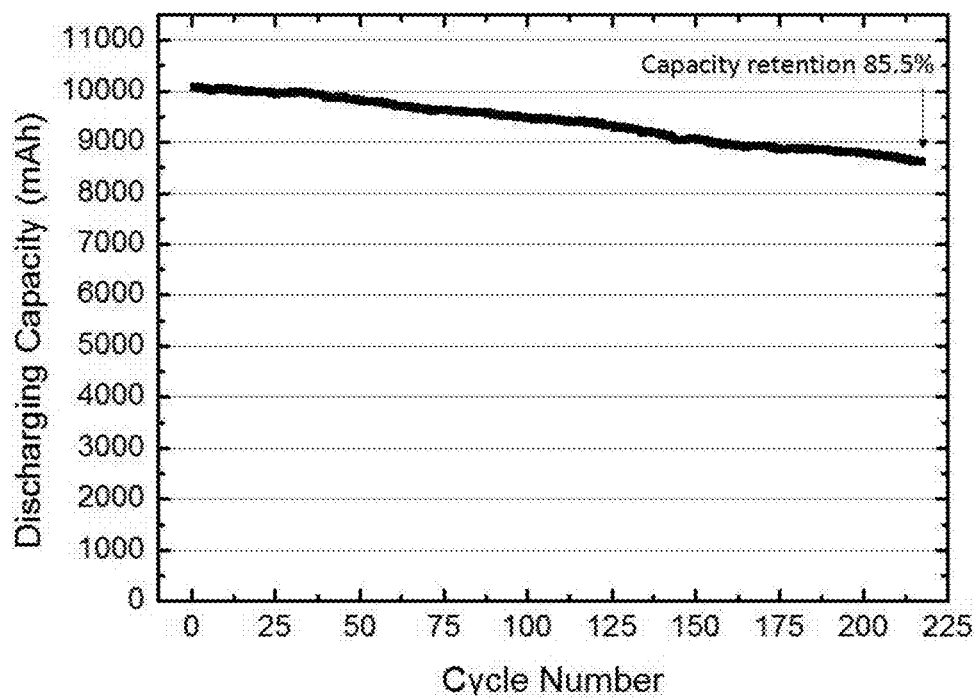
FIG. 11 depicts cyclability performance of an electrochemical cell prepared by the method described in Comparative Example 3.

A pouch type battery cell was assembled in the same manner as in Example 1. The electrochemical performance of the pouch-type battery of Comparative Example 3 was measured and is shown in Table 2 below. Test result of cyclability performance is shown in FIG. 11.

Comparative Example 4

A) Preparation of Positive Electrode

A positive electrode slurry was prepared in the same manner as in Example 4, except that the first suspension was prepared at 40° C.; and the second suspension was homogenized at 40° C. for 10 hours. The viscosity and pH of the slurry at 25° C. were 1940 mPa·s and 9.6 respectively. The solid content of the cathode slurry was 55 wt. %. The formulation of Comparative Example 4 is shown in Table 1 below.

Shortly after preparation, the cathode slurry was coated onto both sides of an aluminum foil having a thickness of 20 μm using a transfer coater with an area density of about 38 mg/cm$^2$. The coated films on the aluminum foil were dried for 5 minutes by a 24-meter-long conveyor hot air drying oven as a sub-module of the transfer coater operated at a conveyor speed of about 4.8 meters/minute and about 65° C. to obtain a positive electrode. The electrode was then pressed to increase the density of the coating and the density was 2.86 g/cm$^3$.

B) Preparation of Negative Electrode

A negative electrode slurry was prepared in the same manner as in Example 2.

C) Assembling of Pouch-Type Battery

Figure 12:
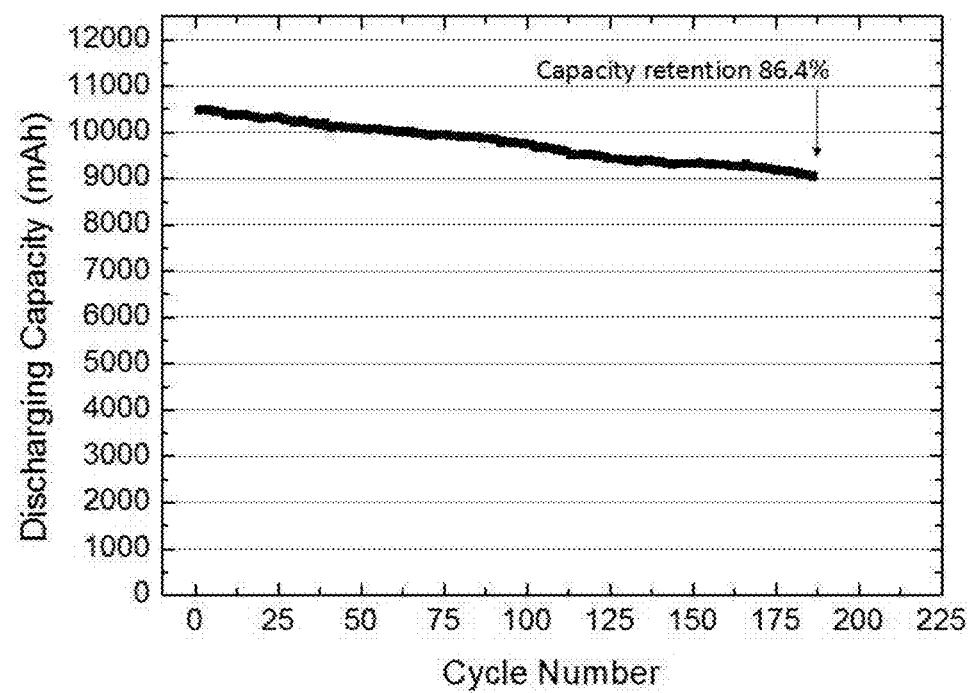
FIG. 12 depicts cyclability performance of an electrochemical cell prepared by the method described in Comparative Example 4.

A pouch type battery cell was assembled in the same manner as in Example 1. The electrochemical performance of the pouch-type battery of Comparative Example 4 was measured and is shown in Table 2 below. Test result of cyclability performance is shown in FIG. 12.

Comparative Example 5

A) Preparation of Positive Electrode

A positive electrode slurry was prepared in the same manner as in Example 2, except that the first suspension was prepared at 15° C.; the solid content of the second suspension was adjusted by adding a mixture of deionized water and ethanol in a weight ratio of 2:1; and the second suspension was homogenized at 15° C. for 3 hours. The viscosity and pH of the slurry at 25° C. were 2,630 mPa·s and 10.3 respectively. The solid content of the cathode slurry was 50 wt. %. The formulation of Comparative Example 5 is shown in Table 1 below.

Shortly after preparation, the homogenized slurry was coated onto both sides of an aluminum foil having a thickness of 20 μm using a transfer coater with an area density of about 38 mg/cm². The coated films on the aluminum foil were dried for 5 minutes by a 24-meter-long conveyor hot air drying oven as a sub-module of the transfer coater operated at a conveyor speed of about 4.8 meters/minute and about 80° C. to obtain a positive electrode. The electrode was then pressed to increase the density of the coating and the density was 3.11 g/cm³.

B) Preparation of Negative Electrode

A negative electrode slurry was prepared in the same manner as in Example 2.

C) Assembling of Pouch-Type Battery

Figure 13:
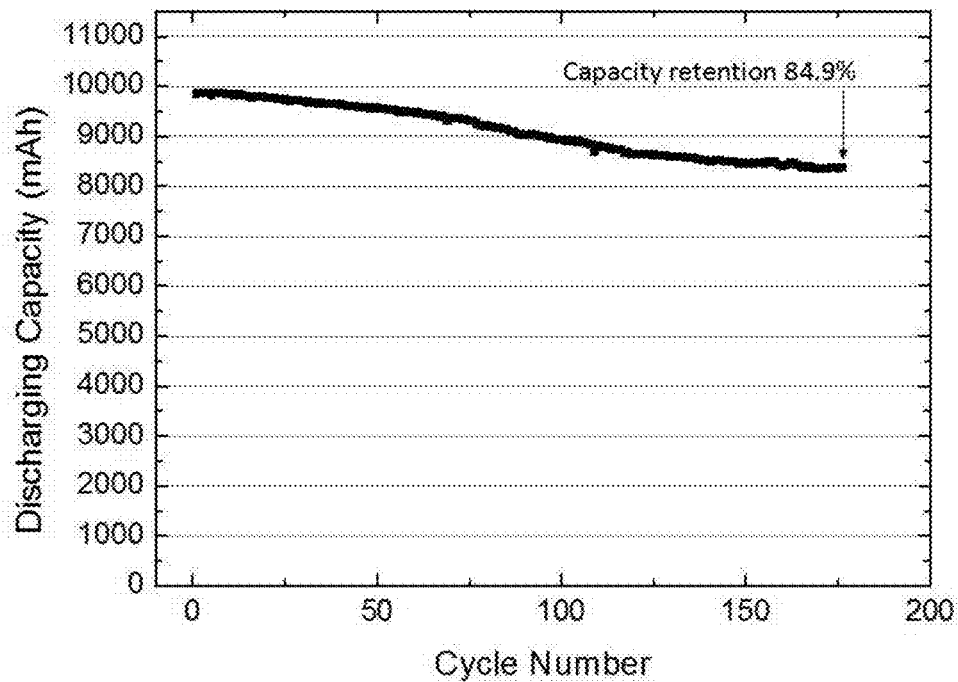
FIG. 13 depicts cyclability performance of an electrochemical cell prepared by the method described in Comparative Example 5.

A pouch type battery cell was assembled in the same manner as in Example 1. The electrochemical performance of the pouch-type battery of Comparative Example 5 was measured and is shown in Table 2 below. Test result of cyclability performance is shown in FIG. 13.

Comparative Example 6

A) Preparation of Positive Electrode

A positive electrode slurry was prepared in the same manner as in Example 5, except that the first suspension was prepared at 15° C.; the solid content of the second suspension was adjusted by adding a mixture of deionized water and isopropanol in a weight ratio of 2:1; and the second suspension was homogenized by a planetary stirring mixer at 15° C. for 2 hours. The viscosity and pH of the slurry at 25° C. were 2,770 mPa·s and 9.6 respectively. The solid content of the cathode slurry was 50 wt. %. The formulation of Comparative Example 6 is shown in Table 1 below.

Shortly after preparation, the cathode slurry was coated onto both sides of an aluminum foil having a thickness of 20 μm using a transfer coater with an area density of about 38 mg/cm². The coated films on the aluminum foil were dried for 15 minutes by a 24-meter-long conveyor hot air drying oven as a sub-module of the transfer coater operated at a conveyor speed of about 4.8 meters/minute and about 40° C. to obtain a positive electrode. The electrode was then pressed to increase the density of the coating and the density was 3.29 g/cm³.

B) Preparation of Negative Electrode

A negative electrode slurry was prepared in the same manner as in Example 2.

C) Assembling of Pouch-Type Battery

Figure 14:
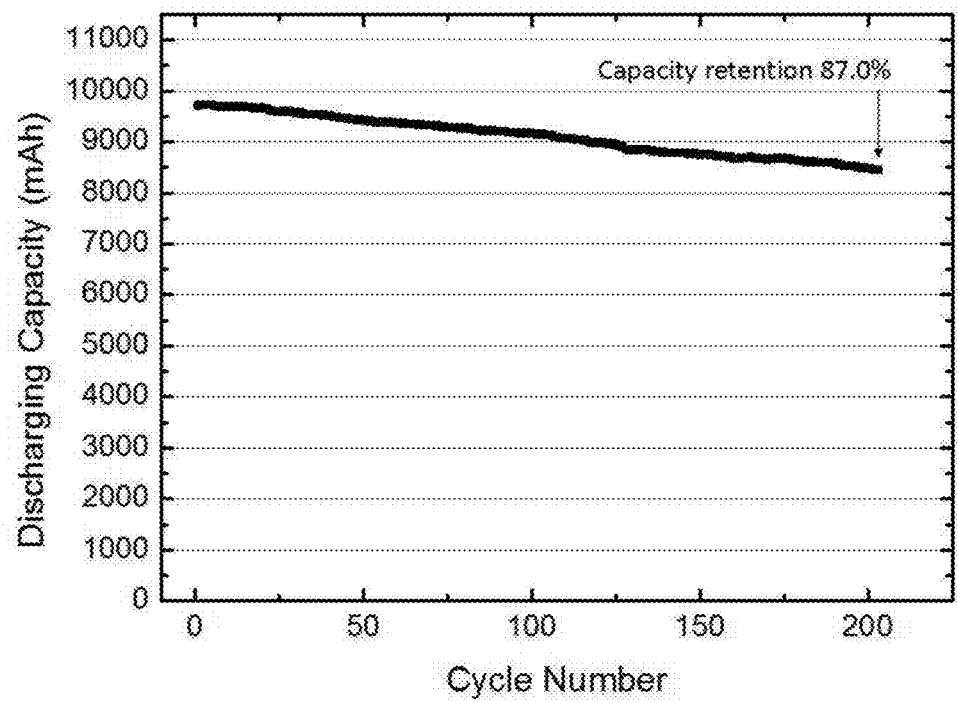
FIG. 14 depicts cyclability performance of an electrochemical cell prepared by the method described in Comparative Example 6.

A pouch type battery cell was assembled in the same manner as in Example 1. The electrochemical performance of the pouch-type battery of Comparative Example 6 was measured and is shown in Table 2 below. Test result of cyclability performance is shown in FIG. 14.

Comparative Example 7

A) Preparation of a Binder Solution

A binder solution was prepared by mixing methyl cellulose (MC) (#M0512, obtained from Sigma-Aldrich, US), sodium polyacrylate (SPA) (432784, obtained from Sigma-Aldrich, US) and styrene-butadiene rubber (SBR) (AL-2001, obtained from NIPPON A&L INC., Japan) in a weight ratio of 5:2:3 in water using a planetary stirring mixer. The total solid content of the binder solution and water were in a weight ratio of 10:7. The planetary blade speed was 40 rpm and the dispersion blade speed was 1,000 rpm.

B) Preparation of a Conductive Gel Solution

A conductive gel solution was prepared by dispersing carbon nanotube (obtained from Shenzhen Nanotech Port Co. Ltd, China) and SuperP (obtained from Timcal Ltd, Bodio, Switzerland) in the binder solution stirred by a planetary stirring mixer at a planetary blade speed of 30 rpm and a dispersion blade speed of 1,800 rpm. The conductive gel solution was milled in a ball mill (MSK-SFM-1, obtained from Shenzhen Kejing Star Technology Ltd., China) at 200 revolutions per minute until the milled material had a fineness of 5 μm.

C) Preparation of a Cathode Slurry

NMC811, water and the milled conductive gel solution were mixed by a planetary stirring mixer at 25° C. at a planetary blade speed of 50 rpm and a dispersion blade speed of 1,800 rpm until the milled material had a fineness of 20 μm to obtain a mixture. A cathode slurry was obtained by vacuum pumping the mixture under a reduced pressure of 85 kPa for 20 minutes. The cathode slurry comprised 30% NMC811, 12% carbon nanotube, 6% Super-P, 5% water-based binder material, and 47% deionized water by weight, based on the total weight of the cathode slurry. The viscosity and pH of the slurry at 25° C. were 1,560 mPa·s and 9.0 respectively. The solid content of the cathode slurry was 55 wt. %. The formulation of Comparative Example 7 is shown in Table 1 below.

D) Preparation of a Cathode Electrode

Shortly after preparation, the cathode slurry was coated onto both sides of an aluminum foil having a thickness of 20 μm using a transfer coater with an area density of about 38 mg/cm². The coated films on the aluminum foil were dried for 5 minutes by a 24-meter-long conveyor hot air drying oven as a sub-module of the transfer coater operated at a conveyor speed of about 4.8 meters/minute and about 70° C. to obtain a positive electrode. The electrode was then pressed to increase the density of the coating and the density was 2.92 g/cm³.

E) Assembling of Pouch-Type Battery

Figure 15:
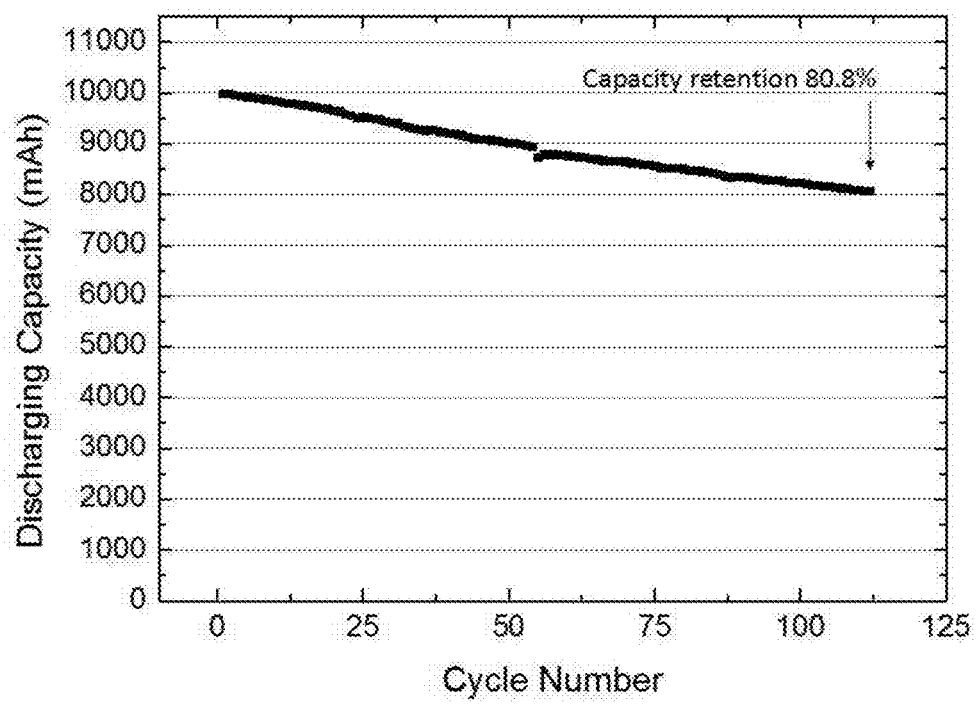
FIG. 15 depicts cyclability performance of an electrochemical cell prepared by the method described in Comparative Example 7.

A pouch type battery cell was assembled in the same manner as in Example 1. The electrochemical performance of the pouch-type battery of Comparative Example 7 was measured and is shown in Table 2 below. Test result of cyclability performance is shown in FIG. 15.

Comparative Example 8

Figure 16:
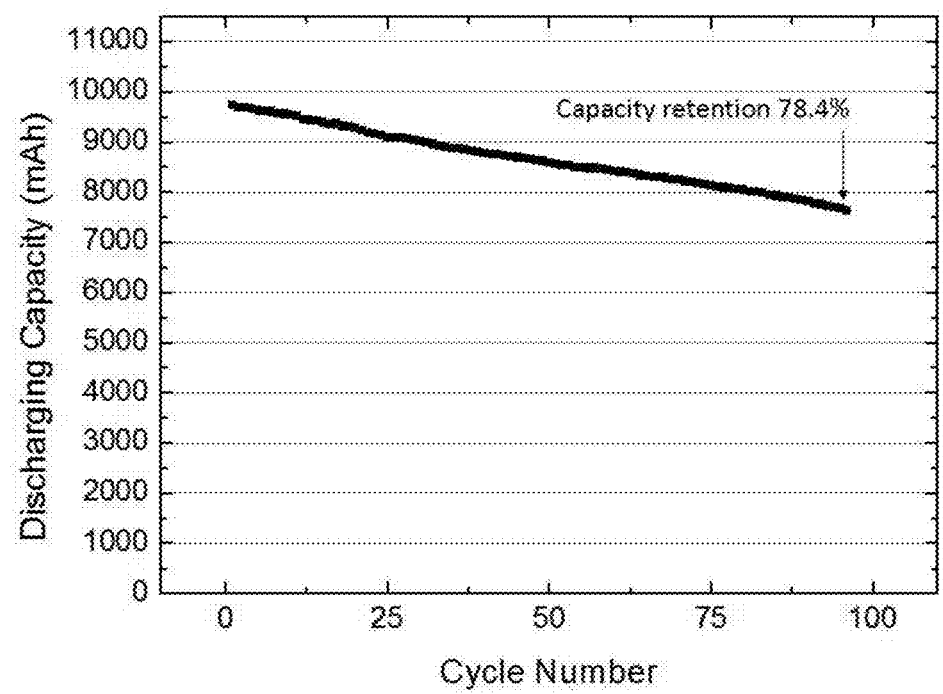
FIG. 16 depicts cyclability performance of an electrochemical cell prepared by the method described in Comparative Example 8.

A pouch-type battery was prepared in the same manner as in Comparative Example 7 except NCA instead of NMC811 as a cathode material was used. The formulation of Comparative Example 8 is shown in Table 1 below. A pouch type battery cell was assembled in the same manner as in Example 1. The viscosity and pH of the slurry at 25° C. were 1,375 mPa·s and 8.7 respectively. The solid content of the cathode slurry was 55 wt. %. The electrochemical performance of the pouch-type battery of Comparative Example 8 was measured and is shown in Table 2 below. Test result of cyclability performance is shown in FIG. 16.

Comparative Example 9

A pouch-type battery was prepared in the same manner as in Example 2 except the second suspension was homogenized at 25° C. The formulation of Comparative Example 9 is shown in Table 1 below. A pouch type battery cell was assembled in the same manner as in Example 1. The viscosity and pH of the slurry at 25° C. were 1,940 mPa·s and 10.7 respectively. The solid content of the cathode slurry was 50 wt. %. The electrochemical performance of the pouch-type battery of Comparative Example 9 was measured and is shown in Table 2 below.

Comparative Example 10

A pouch-type battery was prepared in the same manner as in Example 5 except the second suspension was homogenized at 25° C. The formulation of Comparative Example 10 is shown in Table 1 below. A pouch type battery cell was assembled in the same manner as in Example 1. The viscosity and pH of the slurry at 25° C. were 2,150 mPa·s and 9.8 respectively. The solid content of the cathode slurry was 50 wt. %. The electrochemical performance of the pouch-type battery of Comparative Example 10 was measured and is shown in Table 2 below.

Comparative Example 11

A pouch-type battery was prepared in the same manner as in Example 2 except the second suspension was homogenized for 8 hours. The formulation of Comparative Example 11 is shown in Table 1 below. A pouch type battery cell was assembled in the same manner as in Example 1. The viscosity and pH of the slurry at 25° C. were 1,830 mPa·s and 11 respectively. The solid content of the cathode slurry was 50 wt. %. The electrochemical performance of the pouch-type battery of Comparative Example 11 was measured and is shown in Table 2 below.

Comparative Example 12

A pouch-type battery was prepared in the same manner as in Example 2 except the coated film on the current collector was dried at 80° C. The formulation of Comparative Example 12 is shown in Table 1 below. A pouch type battery cell was assembled in the same manner as in Example 1. The viscosity and pH of the slurry at 25° C. were 2,570 mPa·s and 10.1 respectively. The solid content of the cathode slurry was 50 wt. %. The electrochemical performance of the pouch-type battery of Comparative Example 12 was measured and is shown in Table 2 below.

Comparative Example 13

A pouch-type battery was prepared in the same manner as in Example 2 except the coated film on the current collector was dried for 10 minutes. The formulation of Comparative Example 13 is shown in Table 1 below. A pouch type battery cell was assembled in the same manner as in Example 1. The viscosity and pH of the slurry at 25° C. were 2,610 mPa·s and 10.6 respectively. The solid content of the cathode slurry was 50 wt. %. The electrochemical performance of the pouch-type battery of Comparative Example 13 was measured and is shown in Table 2 below.

TABLE 1

| | Cathode active material | Homogenization Temp (° C.) | Homogenization Time (hrs) | Drying Temp (° C.) | Drying Time (mins) | Cathode binder | Solvent |
|---|---|---|---|---|---|---|---|
| Example 1 | NMC811 | 15 | 2 | 40 | 3.5 | LA 132 | water |
| Example 2 | NMC811 | 10 | 2.5 | 37 | 4.2 | LA 132 | water |
| Example 3 | NMC811 | 0 | 3.5 | 45 | 3.2 | LA 132 | water + ethanol |
| Example 4 | NCA | 15 | 2.5 | 35 | 4.5 | LA 132 | water |
| Example 5 | NCA | 10 | 3.2 | 50 | 3.1 | LA 132 | water |
| Example 6 | NCA | 0 | 4 | 42 | 3.7 | LA 132 | water + IPA |
| Example 7 | NMC622 | 10 | 4 | 45 | 4 | LA 132 | water |
| Example 8 | C-S LNMgO | 10 | 4 | 45 | 4 | LA 132 | water |
| Comparative Example 1 | NMC811 | 25 | 5 | 60 | 5 | LA 132 | water |
| Comparative Example 2 | NMC811 | 40 | 6 | 70 | 5 | LA 132 | water |
| Comparative Example 3 | NCA | 25 | 5 | 55 | 5 | LA 132 | water |
| Comparative Example 4 | NCA | 40 | 10 | 65 | 5 | LA 132 | water |
| Comparative Example 5 | NMC811 | 15 | 3 | 80 | 5 | LA 132 | water + ethanol |
| Comparative Example 6 | NCA | 15 | 2 | 40 | 15 | LA 132 | water + IPA |
| Comparative Example 7 | NMC811 | 25 | 1/3 | 70 | 5 | MC + SBR + SPA | water |
| Comparative Example 8 | NCA | 25 | 1/3 | 70 | 5 | MC + SBR + SPA | water |
| Comparative Example 9 | NMC811 | 25 | 2.5 | 37 | 4.2 | LA132 | water |
| Comparative Example 10 | NCA | 25 | 3.2 | 50 | 3.1 | LA132 | water |
| Comparative Example 11 | NMC811 | 10 | 8 | 37 | 4.2 | LA132 | water |
| Comparative Example 12 | NMC811 | 10 | 2.5 | 80 | 4.2 | LA132 | water |
| Comparative Example 13 | NMC811 | 10 | 2.5 | 37 | 10 | LA132 | water |

The battery was tested galvanostatically at a current density of C/2 at 25° C. on a battery tester (BTS-5V20A, obtained from Neware Electronics Co. Ltd, China) between 3.0 V and 4.2 V. The nominal capacities of the pouch cells of Examples 1-8 and Comparative Examples 1-13 are shown in Table 2 below.

The cyclability performance of the pouch cells of Examples 1-8 and Comparative Examples 1-13 was tested by charging and discharging at a constant current rate of 1C between 3.0 V and 4.2 V at about 60° C. in a heated chamber (T-HWS-150U, Dongguan TIANYI Instrument Co. Ltd., China). Test results of cyclability performance of the pouch cells are shown in Table 2 below.

TABLE 2

| Example | Measured values | | | Estimated values by extrapolation |
|---|---|---|---|---|
| | Nominal capacity (Ah) | No. Of Cycle | Capacity retention (%) | Cycle life of pouch cell with 80% capacity retention |
| Example 1 | 9.68 | 355 | 85.2 | 480 |
| Example 2 | 10.34 | 479 | 82.4 | 544 |
| Example 3 | 9.84 | 491 | 80.6 | 506 |
| Example 4 | 9.5 | 437 | 83.1 | 517 |
| Example 5 | 10.31 | 398 | 83.7 | 488 |
| Example 6 | 9.85 | 469 | 80.9 | 491 |
| Example 7 | 9.22 | 336 | 83.3 | 402 |
| Example 8 | 9.05 | 393 | 81.7 | 430 |
| Comparative Example 1 | 9.64 | 166 | 81.1 | 176 |
| Comparative Example 2 | 10.5 | 137 | 81.6 | 149 |
| Comparative Example 3 | 10.08 | 217 | 85.5 | 299 |
| Comparative Example 4 | 10.48 | 186 | 86.4 | 274 |
| Comparative Example 5 | 9.86 | 176 | 84.9 | 233 |
| Comparative Example 6 | 9.72 | 203 | 87.0 | 312 |
| Comparative Example 7 | 9.97 | 112 | 80.8 | 117 |
| Comparative Example 8 | 9.74 | 96 | 78.4 | 89 |
| Comparative Example 9 | 9.98 | 324 | 83.0 | 381 |
| Comparative Example 10 | 10.31 | 326 | 84.2 | 413 |
| Comparative Example 11 | 9.55 | 361 | 81.3 | 386 |
| Comparative Example 12 | 9.86 | 255 | 84.9 | 338 |
| Comparative Example 13 | 10.38 | 398 | 82.7 | 460 |

The pouch cells of Examples 1-8 showed excellent cyclability under high temperature conditions. Batteries prepared by the method disclosed herein show enhanced performance, especially in the case of the high nickel cathode materials.

Figure 17:
FIG. 17 depicts an image of the surface of the aluminum current collector of Example 2.
Figure 18:
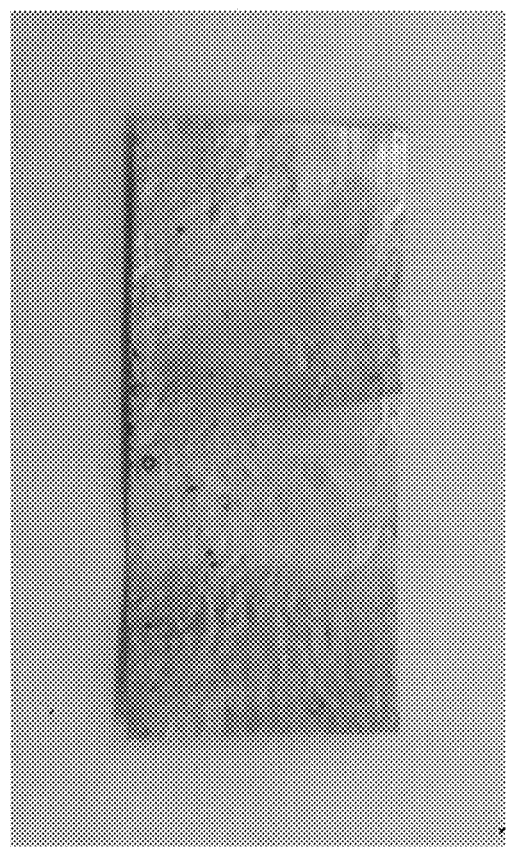
FIG. 18 depicts an image of the surface of the aluminum current collector of Comparative Example 2.

The pouch cells of Example 2 and Comparative Example 2 were dismantled after 200 and 137 charge/discharge cycles respectively. The aluminum current collectors of each cell were examined. Images of the surface of the aluminum current collector of Example 2 and Comparative Example 2 were shown in FIGS. 17 and 18 respectively. The aluminum current collector of Example 2 has a smooth surface whereas that of Comparative Example 2 has a rough surface with pinholes due to corrosion. During coating and drying, aluminum metal in the cathode current collector can dissolve and contaminate the cathode electrode layer. The present invention can prevent corrosion of aluminum current collector.

The pouch cells of Examples 1-8 and Comparative Example 1-13 were fully charged and stored for 2 weeks at 60° C. After 2 weeks the cells were removed from the 60° C. chamber and tested at 25° C. The cells were discharged at 1 C, during discharge the remaining capacity was measured. Test results are shown in Table 3 below.

TABLE 3

| Example | Capacity retention (%) after storage for 2 weeks at 60° C. |
|---|---|
| Example 1 | 63 |
| Example 2 | 69 |
| Example 3 | 71 |
| Example 4 | 67 |
| Example 5 | 76 |
| Example 6 | 62 |
| Example 7 | 72 |
| Example 8 | 78 |
| Comparative Example 1 | 51 |
| Comparative Example 2 | 42 |
| Comparative Example 3 | 57 |
| Comparative Example 4 | 46 |
| Comparative Example 5 | 39 |
| Comparative Example 6 | 47 |
| Comparative Example 7 | 37 |
| Comparative Example 8 | 32 |
| Comparative Example 9 | 63 |
| Comparative Example 10 | 61 |
| Comparative Example 11 | 66 |
| Comparative Example 12 | 55 |
| Comparative Example 13 | 59 |

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method of preparing a cathode for a secondary battery, comprising the steps of:
   1) dispersing a binder material and a conductive agent in an aqueous solvent to form a first suspension;
   2) cooling the first suspension to a temperature from about −5° C. to about 15° C.;
   3) adding a cathode active material into the first suspension to form a second suspension;
   4) homogenizing the second suspension by a homogenizer at a temperature from about −5° C. to about 15° C. to obtain a homogenized slurry;
   5) applying the homogenized slurry on a current collector to form a coated film on the current collector; and
   6) drying the coated film on the current collector at a temperature from about 35° C. to about 65° C. to form the cathode,
   wherein the aqueous solvent is water and wherein the total processing time for steps 5) and 6) is less than 5 minutes.

2. The method of claim 1, wherein the binder material is selected from the group consisting of styrene-butadiene rubber, acrylated styrene-butadiene rubber, acrylonitrile copolymer, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, polyvinylidene fluoride, poly(vinylidene fluoride)-hexafluoropropene, and combinations thereof.

3. The method of claim 2, wherein the salt of alginic acid comprises a cation selected from Na, Li, K, Ca, $NH_4$, Mg, Al, or a combination thereof.

4. The method of claim 1, wherein the conductive agent is selected from the group consisting of carbon, carbon black, graphite, expanded graphite, graphene, graphene nanoplatelets, carbon fibres, carbon nano-fibers, graphitized carbon flake, carbon tubes, carbon nanotubes, activated carbon, mesoporous carbon, and combinations thereof.

5. The method of claim 1, wherein the aqueous solvent further comprises ethanol, isopropanaol, methanol, acetone, n-propanol, t-butanol, n-butanol, dimethyl ketone, methyl ethyl ketone, ethyl acetate, isopropyl acetate, propyl acetate, and combinations thereof.

6. The method of claim 1, wherein the cathode active material is selected from the group consisting of $Li_{1+x}Ni_aMn_bCo_cAl_{(1-a-b-c)}O_2$, $LiNi_{0.33}Mn_{0.33}Co_{0.33}O_2$, $LiNi_{0.4}Mn_{0.4}Co_{0.2}O_2$, $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.4}Co_{0.04}O_2$, $LiNi_{0.8}Co_{0.15}Al_{0.05}O_2$, $LiNiO_2$, $LiMnO_2$, $LiMn_2O_4$, $Li_2MnO_3$, and combinations thereof; wherein $-0.2 \leq x \leq 0.2$, $0 \leq a < 1$, $0 \leq b < 1$, $0 \leq c < 1$, and $a+b+c \leq 1$.

7. The method of claim 1, wherein the cathode active material is selected from the group consisting of $LiNi_{0.5}Mn_{0.3}Co_{0.2}O_2$, $LiNi_{0.6}Mn_{0.2}Co_{0.2}O_2$, $LiNi_{0.7}Mn_{0.15}Co_{0.15}O_2$, $LiNi_{0.8}Mn_{0.1}Co_{0.1}O_2$, $LiNi_{0.92}Mn_{0.04}Co_{0.04}O_2$, $LiNi_{0.8}Co_{0.15}Al_{0.05}O_2$, $LiNiO_2$, $LiMnO_2$, $LiMn_2O_4$, $Li_2MnO_3$, and combinations thereof.

8. The method of claim 1, wherein the cathode active material comprises or is a core-shell composite having a core and shell structure, wherein the core and the shell each independently comprise a lithium transition metal oxide selected from the group consisting of $Li_{1+x}Ni_aMn_bCo_cAl_{(1-a-b-c)}O_2$, $LiCoO_2$, $LiNiO_2$, $LiMnO_2$, $LiMn_2O_4$, $Li_2MnO_3$, $LiCrO_2$, $Li_4Ti_5O_{12}$, $LiV_2O_5$, $LiTiS_2$, $LiMoS_2$, and combinations thereof; wherein $-0.2 \leq x \leq 0.2$, $0 \leq a < 1$, $0 \leq b < 1$, $0 \leq c < 1$, and $a+b+c \leq 1$.

9. The method of claim 1, wherein the second suspension is homogenized by a planetary stirring mixer, a stirring mixer, a blender, or an ultrasonicator.

10. The method of claim 1, wherein the homogenization is performed under vacuum at a pressure from about 0.5 kPa to about 10 kPa.

11. The method of claim 1, wherein the second suspension is homogenized for about 0.5 hour to about 6 hours.

12. The method of claim 1, wherein the second suspension is homogenized for a time period of less than 3 hours, less than 2 hours, or less than 1 hour.

13. The method of claim 1, wherein the viscosity of the homogenized slurry is from about 1,000 mPa·s to about 6,000 mPa·s.

14. The method of claim 1, wherein the solid content of the homogenized slurry is from about 30% to about 60% by weight, based on the total weight of the homogenized slurry.

15. The method of claim 1, wherein the homogenized slurry is applied on the current collector using a doctor blade coater, a slot-die coater, a transfer coater, or a spray coater.

16. The method of claim 1, wherein the coated film is dried by a conveyor hot air drying oven, a conveyor resistance drying oven, a conveyor inductive drying oven, or a conveyor microwave drying oven.

17. The method of claim 1, wherein the total processing time for steps 3)-6) is from about 2 hours to about 6 hours.

18. The method of claim 1, wherein the total processing time for steps 3)-6) is less than 5 hours or less than 3 hours.

* * * * *

UNITED STATES PATENT AND TRADEMARK OFFICE
CERTIFICATE OF CORRECTION

PATENT NO. : 9,991,504 B2
APPLICATION NO. : 15/404227
DATED : June 5, 2018
INVENTOR(S) : Kam Piu Ho, Ranshi Wang and Peihua Shen Page 1 of 1

It is certified that error appears in the above-identified patent and that said Letters Patent is hereby corrected as shown below:

In the Claims
Column 31, Line 33, "$LiNi_{0.8}Mn_{0.1}C_{0.1}O_2$" should read -- $LiNi_{0.8}Mn_{0.1}Co_{0.1}O_2$ --.
Column 31, Line 34, "$LiNi_{0.92}Mn_{0.4}Co_{0.04}O_2$" should read -- $LiNi_{0.92}Mn_{0.04}Co_{0.04}O_2$ --.
Column 31, Line 40, "$LiNi_{0.8}Mn_{0.1}C_{0.1}O_2$" should read -- $LiNi_{0.8}Mn_{0.1}Co_{0.1}O_2$ --.
Column 32, Line 1, "$LiNi_{0.92}Mn_{0.04}C_{0.04}O_2$" should read -- $LiNi_{0.92}Mn_{0.04}Co_{0.04}O_2$ --.

Signed and Sealed this
Twenty-sixth Day of February, 2019

Andrei Iancu
*Director of the United States Patent and Trademark Office*